(12) United States Patent
Pearson

(10) Patent No.: US 7,087,327 B2
(45) Date of Patent: Aug. 8, 2006

(54) ELECTRIC POWER PLANT WITH ADJUSTABLE ARRAY OF FUEL CELL SYSTEMS

(75) Inventor: Martin T. Pearson, Burnaby (CA)

(73) Assignee: Ballard Power Systems Inc., Burnaby (CA)

( * ) Notice: Subject to any disclaimer, the term of this patent is extended or adjusted under 35 U.S.C. 154(b) by 253 days.

(21) Appl. No.: 10/440,025

(22) Filed: May 16, 2003

(65) Prior Publication Data

US 2004/0126635 A1 Jul. 1, 2004

Related U.S. Application Data

(60) Provisional application No. 60/436,759, filed on Dec. 27, 2002.

(51) Int. Cl.
*H01M 8/00* (2006.01)

(52) U.S. Cl. .................................. 429/12; 320/101

(58) Field of Classification Search ................ 429/12; 320/101

See application file for complete search history.

(56) References Cited

U.S. PATENT DOCUMENTS

| | | | |
|---|---|---|---|
| 3,800,208 A | 3/1974 | Macharg | 320/20 |
| 3,823,358 A | 7/1974 | Rey | 320/3 |
| 4,000,003 A | 12/1976 | Baker et al. | 429/7 |
| 4,056,764 A | 11/1977 | Endo et al. | 320/3 |
| 4,721,660 A | 1/1988 | Kujas | 429/40 |
| 4,839,574 A | 6/1989 | Takabayashi | 320/3 |
| 4,883,724 A | 11/1989 | Yamamoto | 429/23 |
| 4,904,548 A | 2/1990 | Tajima | 429/22 |
| 4,931,947 A | 6/1990 | Werth et al. | 364/492 |
| 4,962,462 A | 10/1990 | Fekete | 364/492 |
| 5,154,986 A | 10/1992 | Takechi et al. | 429/23 |
| 5,318,142 A | 6/1994 | Bates et al. | 180/65.2 |
| 5,334,463 A | 8/1994 | Tajima et al. | 429/9 |
| 5,339,018 A | 8/1994 | Brokaw | 320/35 |
| 5,482,790 A | 1/1996 | Yamada et al. | 429/9 |
| 5,624,768 A | 4/1997 | Tanokura | 429/23 |
| 5,714,874 A | 2/1998 | Bonnefoy | 323/299 |
| 5,780,980 A | 7/1998 | Naito | 318/139 |
| 5,916,699 A | 6/1999 | Thomas et al. | 429/3 |
| 5,929,594 A | 7/1999 | Nonobe et al. | 320/104 |
| 5,998,885 A | 12/1999 | Tamor et al. | 307/10.1 |
| 6,011,324 A | 1/2000 | Kohlstruck et al. | 307/64 |
| 6,030,718 A | 2/2000 | Fuglevand et al. | 429/26 |

(Continued)

FOREIGN PATENT DOCUMENTS

DE 1 080 680 4/1960

(Continued)

OTHER PUBLICATIONS

Boyer, C., et al., "Evaluation of Methods to Increase the Oxygen Partial Pressure in PEM Fuel Cells," *Journal of Applied Electrochemistry* 29:1095-1102, 1999.

(Continued)

*Primary Examiner*—Patrick Joseph Ryan
*Assistant Examiner*—Ben Lewis
(74) *Attorney, Agent, or Firm*—Seed IP Law Group PLLC

(57) ABSTRACT

An electric power plant includes an array of fuel cell systems. The fuel cell systems are electrically couplable in series and/or parallel combinations to provide a variety of output powers, output current and/or output voltages. The fuel cell systems are "hot swappable" and redundant fuel cell systems may automatically replace faulty fuel cell systems to maintain output power, current and/or voltage.

23 Claims, 24 Drawing Sheets

U.S. PATENT DOCUMENTS

| | | | |
|---|---|---|---|
| 6,100,665 A | 8/2000 | Alderman | 320/127 |
| 6,134,124 A | 10/2000 | Jungreis et al. | 363/34 |
| 6,158,537 A | 12/2000 | Nonobe | 180/65.3 |
| 6,184,593 B1 | 2/2001 | Jungreis | 307/64 |
| 6,214,484 B1 | 4/2001 | Hauer | 429/9 |
| 6,215,272 B1 | 4/2001 | Ohara et al. | 320/104 |
| 6,255,008 B1 | 7/2001 | Iwase | 429/9 |
| 6,497,974 B1 | 12/2002 | Fuglevand | 429/22 |
| 6,555,989 B1 | 4/2003 | Pearson | 320/101 |
| 6,573,682 B1 * | 6/2003 | Pearson | 320/101 |
| 6,847,515 B1 * | 1/2005 | Kelley et al. | 361/160 |
| 2001/0044040 A1 | 11/2001 | Uribe et al. | 429/13 |
| 2001/0049038 A1 | 12/2001 | Dickman et al. | 429/19 |
| 2001/0053465 A1 | 12/2001 | Fuglevand | 429/9 |
| 2002/0021109 A1 | 2/2002 | Marvin et al. | 320/134 |
| 2002/0031692 A1 | 3/2002 | Fuglevand et al. | 429/22 |
| 2002/0036430 A1 | 3/2002 | Welches et al. | 307/18 |
| 2002/0051898 A1 | 5/2002 | Moulthrop, Jr. et al. | 429/17 |
| 2002/0094476 A1 | 7/2002 | Mattejat et al. | 429/160 |
| 2002/0102447 A1 | 8/2002 | Kato | 429/23 |
| 2002/0109410 A1 | 8/2002 | Young et al. | 307/64 |
| 2002/0169523 A1 | 11/2002 | Ross et al. | 700/286 |
| 2003/0022037 A1 | 1/2003 | Parr et al. | 429/22 |
| 2003/0072977 A1 | 4/2003 | Speranza et al. | 429/9 |
| 2003/0111977 A1 | 6/2003 | Pearson | 320/101 |
| 2003/0113594 A1 | 6/2003 | Pearson | 429/9 |
| 2003/0113599 A1 | 6/2003 | Pearson | 429/23 |
| 2004/0009380 A1 * | 1/2004 | Pearson | 429/23 |

FOREIGN PATENT DOCUMENTS

| | | |
|---|---|---|
| DE | 1 301 861 | 8/1969 |
| DE | 198 10 468 A1 | 9/1999 |
| DE | 100 10 985 A1 | 9/2001 |
| EP | 0 136 187 A2 | 4/1985 |
| EP | 0 334 474 A2 | 9/1989 |
| EP | 1 009 054 A2 | 6/2000 |
| EP | 1 065 775 A2 | 1/2001 |
| GB | 1131171 | 10/1968 |
| GB | 2 281 642 A | 3/1995 |
| JP | 58-133789 | 8/1983 |
| JP | 59-134573 | 8/1984 |
| JP | 1-234024 | 9/1989 |
| JP | 5-47396 | 2/1993 |
| JP | 6-29029 | 2/1994 |
| JP | 6-314569 | 11/1994 |
| JP | 7-105965 | 4/1995 |
| JP | 8-50902 | 2/1996 |
| JP | 8-213032 | 8/1996 |
| JP | 11-191424 | 7/1999 |
| WO | WO 01/71885 A1 | 9/2001 |
| WO | WO 01/73879 A1 | 10/2001 |
| WO | WO 02/084670 A1 | 10/2002 |
| WO | WO 02/095851 A1 | 11/2002 |

OTHER PUBLICATIONS

U.S. Appl. No. 60/421,126, filed May 16, 2002, Pearson.
U.S. Appl. No. 60/436,759, filed Dec. 27, 2002, Pearson.
Mai, W., "Dual Current-Limiting Switch for USB Applications," *Electronic Design*, pp. 124, 126, May 2000.
Rufer, A. et al., "A Supercapacitor-Based Energy Storage System for Elevators with Soft Commutated Interface," in *Proceedings of the Energy Storage Association, Spring Meeting 2001*, Chattanooga, TN, Mar. 2001, retrieved from http://leiwww.epfl.ch/publications/rufer_barrade_ias_01.pdf.
Schneuwly, A. et al., "BOOSTCAP® Double-Layer Capacitors for Peak Power Automotive Applications," in *Proceedings of the Energy Storage Association, Spring Meeting 2001*, Chattanooga, TN, Mar. 2001, retrieved from http://ecl.web.psi.ch/Publications/cap_pub/AABC_2002.pdf.
EPRIsolutions, Inc., "Market Assessment of Ultracapacitors for Medium and High Power Applications," Palo Alto, CA, 2000, 1000810.
Power Distribution Inc., "PDI Switcher Solutions: CBEMA Curve Reissued," Richmond VA, 1998.
Texas Instruments Incorporated, "'Hot Plug-In' In-Rush Current Limiting Circuits for Power Trends' DC-DC Converters," Dallas, TX, 2000.
U.S. Appl. No. 10/440,034, filed May 16, 2003, Pearson.
U.S. Appl. No. 10/440,451, filed May 16, 2003, Pearson.
U.S. Appl. No. 10/440,512, filed May 16, 2003, Pearson.
Warner, S., "Extending the Reliability of DC Power in a Telecommunications Network," in *Proceedings of the 15th Int'l. Telecommunications Energy Conference*, Paris, France, 1993, pp. 83-86.
Maloney, T., "PEM-Battery: Design, Construction, and Test," *Power Computing Solutions, Inc.*, NETL Publications 1999 Conference Proceedings.
Ertl, H. et al., "A Novel Multi-Cell DC-AC Converter for Applications in Renewable Energy Systems," in *Proceedings of the 43rd Int'l Power Electronics Conference*, Jun. 2001.
Passive Component Industry, "Large-Can EDLC Capacitors: A Market in the Making," Jul./Aug. 2001, pp. 7-14.
Nickerson, J., "Ultracapacitors: Managing Power and Energy," Darnell Group, Inc. 2000.
Kato, N. et al., "A 1kW Portable Fuel Cell System Based on Polymer Electrolyte Fuel Cells," *NTT R and D* 48(12):877-881, 1991.
Apollo 13 Review Board (Cortright Commission), "Report of Apollo 13 Review Board," NASA, pp. i-x; Appendix A, Jun. 15, 1970.
Key, T., "Fast Response, Load Matching Hybrid Fuel Cell," EPRI PEAC, Quarterly Review Meeting, Jul. 27, 2001.

* cited by examiner

112 — ELECTRICALLY COUPLE AN ADDITIONAL FUEL CELL SYSTEM IN SERIES ON THE POWER BUS

FIG. 8

114 — ELECTRICALLY COUPLE AN ADDITIONAL FUEL CELL SYSTEM IN PARALLEL ON THE POWER BUS

132 — DETERMINE AT LEAST ONE OF DESIRED POWER, VOLTAGE AND CURRENT OUTPUT FROM POWER SUPPLY SYSTEM

134 — DETERMINE AN ELECTRICAL CONFIGURATION OF SERIES AND/OR PARALLEL COMBINATIONS OF A NUMBER OF FUEL CELL SYSTEMS TO PROVIDE THE DESIRED POWER, VOLTAGE AND CURRENT

136 — OPERATE A NUMBER OF SWITCHES TO ELECTRICALLY COUPLE A NUMBER OF FUEL CELL SYSTEMS INTO THE DETERMINED CONFIGURATION

FIG. 10

ELECTRIC POWER PLANT WITH ADJUSTABLE ARRAY OF FUEL CELL SYSTEMS

BACKGROUND OF THE INVENTION

1. Field of the Invention

This disclosure generally relates to power supplies, for example, fuel cell systems, and to electrical power storage devices, for example, batteries and/or ultracapacitors.

2. Description of the Related Art

Fuel cells are known in the art. Fuel cells electrochemically react a fuel stream comprising hydrogen and an oxidant stream comprising oxygen to generate an electric current. Fuel cell electric power plants have been employed in transportation, portable and stationary applications.

Stationary and portable applications include distributed power generation, back-up power, peak power, and uninterruptible power supply (UPS) systems. Distributed power generation relates to providing electrical power to residential, commercial and/or industrial customers instead of, or as a supplement to, the utility power grid. Power plants in such applications typically operate continuously. They are particularly suited to situations where the power grid is not available or sufficiently reliable. Peak power systems are intended to supplement the power grid, providing electrical power intermittently during periods of peak use when sufficient grid power may not be available or when the rate charged by the utility increases. Back-up power and UPS systems provide electrical power during periods when the power grid, or other primary power source, is unavailable.

In addition, UPS systems must be able to provide power to the consumer substantially continuously, i.e., they must be "instant on" so that the loss of grid power does not result in an interruption of power supply to the consumer. Consumers who rely on electronic equipment, for example, cannot tolerate even minor interruptions in power supply. In this regard, the Information Technology Industry Council has issued guidelines for voltage dropouts, which are not to exceed 20 milliseconds. In this context, a voltage dropout includes both severe RMS voltage sags and complete interruptions of the applied voltage.

Conventional back-up power and UPS systems employ rechargeable battery banks for supplying electric power when the power grid is interrupted. For applications where a relatively short run time is acceptable, battery banks may be the sole source of back-up power. Where longer run times are required, however, such systems also employ a generator to supply power. In this case, the battery banks provide immediate power until the generator can come online.

Valve regulated lead acid (VRLA) batteries are most often employed in the battery banks. The number of batteries depends on the required run time. For lower power applications (2–7.5 kW), run times of 15 minutes or less are common; other systems employing batteries alone may require run times of 4–8 hours, or more. Current limits are set on re-charging of batteries to avoid damaging them. In practice, VRLA batteries are recharged at a 6×–10×rate, that is, the time to fully re-charge the batteries is six to ten times longer than their run time.

These conventional power supply systems have several significant disadvantages. For example, particularly in applications requiring extended battery run time (e.g., >4 hr), VRLA battery banks are large and heavy. A large battery bank requires a significant amount of indoor floor space for installation, which can be expensive. In addition, the weight of the battery bank may require indoor floor space with increased loading capacity, further increasing costs. Environmental regulations relating to the storage and operation of VRLA batteries also add to increased installation costs. Operating and maintaining a generator further adds to the cost and complexity of systems employing them.

Back-up power and UPS systems employing fuel cell electric power plants have also been described. The described systems have several disadvantages relating to the supply of reactants to the fuel cells, the time it takes for the fuel cells to produce full power, and their surge demand capacity, for example.

Fuel cell output is proportional to the amount of reactants supplied. On start-up, there is typically a delay until the fuel cells reach full operating power. For this reason, back-up or UPS systems solely employing fuel cells are inadequate for some applications because they are not "instant on". One approach has been to keep the fuel cells in such systems continuously running, either supplying power to the load or in a low output "stand-by" mode. While this approach improves response time, it exacerbates hydrogen storage issues by significantly increasing hydrogen consumption. In addition, operational lifetime of the power plant may be adversely affected compared to systems where the power plant is operated intermittently.

Fuel cells can be damaged if the load requirements exceed their maximum output. Thus, in power plants solely employing fuel cells, the rated output of the fuel cell stack is generally matched to the expected peak load. In applications where transient load increases are significantly higher than normal load requirements, this necessitates a larger size and output fuel cell stack than required for normal operation in order to deal with surge demand. This, in turn, undesirably increases the cost of the power plant.

In most practical applications, it is desirable to maintain an approximately constant voltage output from the fuel cell stack. One approach is to employ a battery electrically coupled in parallel with the fuel cell system to provide additional current when the demand of the load exceeds the output of the fuel cell stack and to store current when the output of the fuel cell stack exceeds the demand of the load, as taught in commonly assigned pending U.S. Pat. No. 6,841,275, issued Jan. 11, 2005 entitled "Method and Apparatus for Controlling Voltage From a Fuel Cell System"; Ser. No. 10/017,462 entitled "Method and Apparatus for Multiple Mode Control of Voltage From a Fuel Cell System" and U,S. Pat. No. 6,573,682, Jun. 3, 2003 entitled "Fuel Cell System Multiple Stage Voltage Control Method and Apparatus", all filed Dec. 14, 2001.

The many different practical applications for fuel cell based power supplies require a large variety of different power delivery capabilities. In most instances it is prohibitively costly and operationally inefficient to employ a power supply capable of providing more power than required by the application. It is also costly and inefficient to design, manufacture and maintain inventories of different power supplies capable of meeting the demand of each potential application (e.g., 1 kW, 2 kW, 5 kW, 10 kW, etc.). Further, it is desirable to increase the reliability of the power supply, without significantly increasing the cost. Thus, a less costly, less complex and/or more efficient approach to fuel cell based power supplies is desirable.

BRIEF SUMMARY OF THE INVENTION

An electric power plant is provided. In one aspect, the present power plant comprises: a power supply system, the power supply system comprising a power bus and first and second fuel cell systems; an oxidant supply system for supplying an oxidant gas; and a fuel supply system for supplying a fuel gas. Each of the fuel cell systems comprises a fuel cell stack; the first and second fuel cell systems further comprising an electrical storage device electrically coupled in parallel with at least one of the stacks. Each fuel cell system further comprises a switch selectively operable to electrically couple the fuel cell system in series in the power bus.

In another aspect, the present electric power plant comprises: an array of fuel cell system; an oxidant supply system for supplying an oxidant gas; and a fuel supply system for supplying a fuel gas. The array comprises: a power bus; a plurality of fuel cell systems electrically couplable in series to the power bus, each of the fuel cell systems comprising a fuel cell stack; an electrical storage device electrically coupled in parallel with at least one of the stacks; a plurality of switches selectively operable to electrically decouple a respective one of the fuel cell systems from the power bus, each of the switches responsive to an operating condition of the respective one of the fuel cell systems; and, one or more redundancy switches selectively operable to electrically couple one of the fuel cell systems to the power bus, the redundancy switch(es) responsive to an operating condition different from the operating condition of the respective fuel cell stack.

In a further aspect, the electric power plant comprises: at least two fuel cell systems; means for selectively electrically coupling the at least two fuel cell systems in series; an oxidant supply system for supplying an oxidant gas; and a fuel supply system for supplying a fuel gas. Each of the fuel cell systems comprises: a fuel cell stack; an electrical storage device electrically coupled in parallel with the fuel cell stack; a series pass element electrically coupled between the fuel cell stack and the electrical storage device; and regulating means for regulating the series pass element electrically coupled between the fuel cell stack and the electrical storage device.

In still another aspect, the electric power plant comprises: an array of fuel cell systems; an oxidant supply system for supplying an oxidant gas; and a fuel supply system for supplying a fuel gas. Each of the fuel cell systems comprises: a fuel cell stack; an electrical storage device electrically coupled in parallel with the stack; a series pass element electrically coupled between the stack and the electrical storage device; and regulating means for regulating the series pass element electrically coupled between the stack and the electrical storage device.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 8 is a flow diagram of an optional step for inclusion in the method of FIG. 7.

FIG. 9 is a flow diagram of an optional step for inclusion with the method of FIG. 7.

FIG. 10 is a flow diagram showing a method of operating the power supply system of FIGS. 2 and 3 according to an additional or alternative exemplary embodiment including electrically coupling a number of fuel cell systems in a determined series and/or parallel combination to produce at least one of a desired power, voltage and current output.

DETAILED DESCRIPTION OF THE INVENTION

In the following description, certain specific details are set forth in order to provide a thorough understanding of the various embodiments of the invention. However, one skilled in the art will understand that the invention may be practiced without these details. In other instances, well-known structures associated with fuel cells, fuel cell stacks, electrical power storage devices such as batteries, flywheels, and super- or ultracapacitors, reactant delivery systems, temperature control systems and fuel cell systems have not been shown or described in detail to avoid unnecessarily obscuring descriptions of the embodiments of the invention. The terms supercapacitor and ultracapacitor are used interchangeably throughout the description and claims.

Unless the context requires otherwise, throughout the specification and claims which follow, the word "comprise" and variations thereof, such as, "comprises" and "comprising" are to be construed in an open, inclusive sense, that is as "including, but not limited to."

Fuel Cell System Overview

Figure 1:
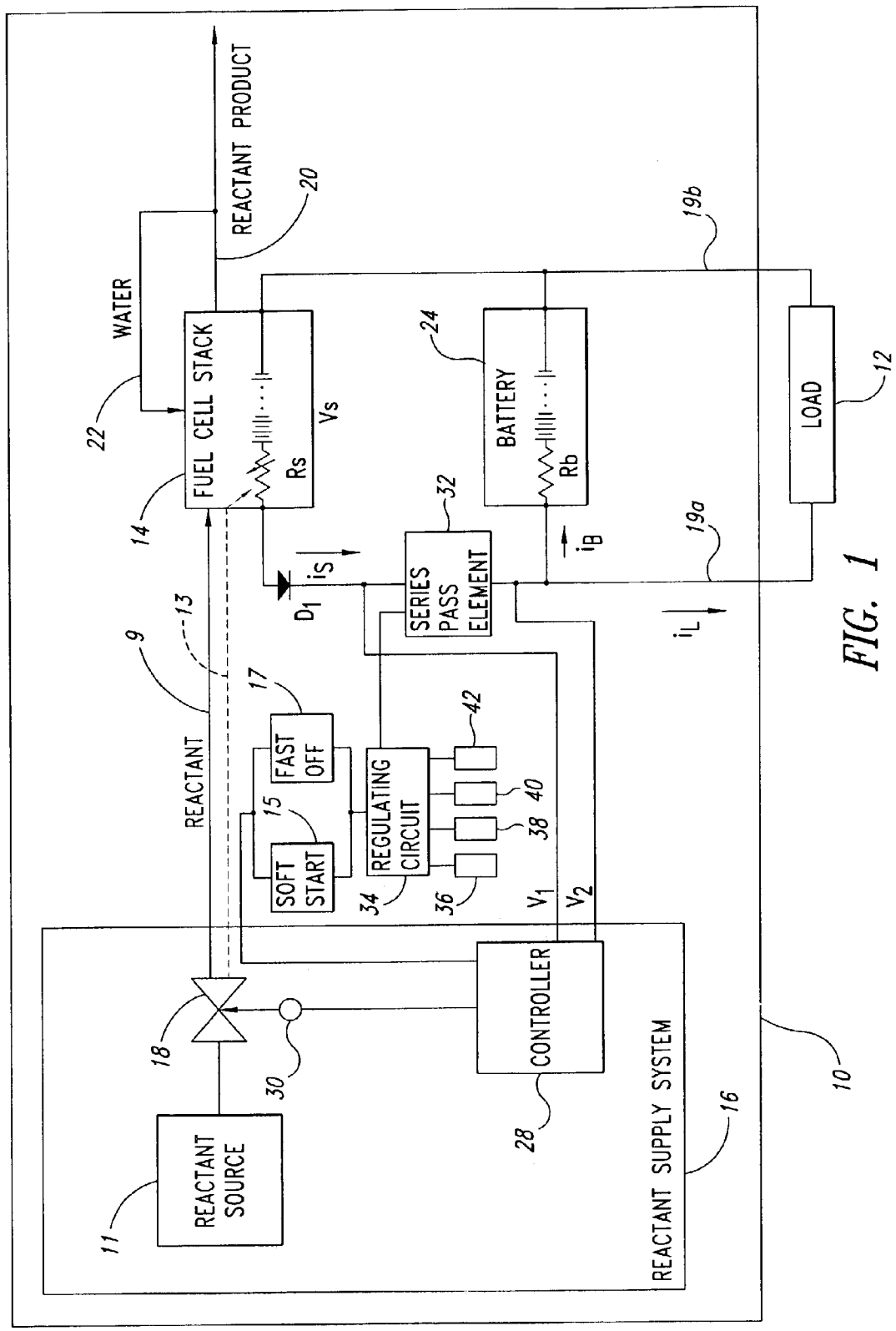
FIG. 1 is a schematic diagram of a hybrid fuel cell system powering a load, the hybrid fuel cell system having a fuel cell stack, a battery, a series pass element, a first stage including a regulating circuit for controlling current flow through the series pass element and a second stage including a controller employing a voltage difference across the series pass element to reduce the energy dissipated by the series pass element via control of reactant partial pressure, the fuel cell system for use with an illustrated general embodiment of the invention.

FIG. 1 shows a hybrid fuel cell system 10 providing power to a load 12 for use in an illustrated embodiment of the invention. The load 12 typically constitutes the device to be powered by the hybrid fuel cell system 10, such as a vehicle, appliance, computer and/or associated peripherals. While the hybrid fuel cell system 10 is not typically considered part of the load 12, portions of the hybrid fuel cell system 10 such as the control electronics may constitute a portion or all of the load 12 in some possible embodiments.

The fuel cell system 10 comprises a fuel cell stack 14 composed of a number of individual fuel cells electrically coupled in series. The fuel cell stack 14 receives reactants, represented by arrow 9, such as hydrogen and air via a reactant supply system 16. The reactant supply system 16 may comprise one or more reactant supply reservoirs or sources 11, a reformer (not shown), and/or one or more control elements such as one or more compressors, pumps and/or valves 18 or other reactant regulating elements. Operation of the fuel cell stack 14 produces reactant product, represented by arrow 20, typically including water. The fuel cell system 10 may reuse some or all of the reactant products 20. For example, as represented by arrow 22, some or all of the water may be returned to the fuel cell stack 14 to humidify the hydrogen and air at the correct temperature and/or to hydrate the ion exchange membranes (not shown) or to control the temperature of the fuel cell stack 14.

The fuel cell stack 14 can be modeled as an ideal battery having a voltage equivalent to an open circuit voltage and a series resistance $R_S$. The value of the series resistance $R_S$ is principally a function of stack current $I_S$, the availability of reactants, and time. The series resistance $R_S$ varies in accordance with the polarization curves for the particular fuel cell stack 14. The series resistance $R_S$ can be adjusted by controlling the availability of reactants 9 to drop a desired voltage for any given current, thus allowing an approximately uniform stack voltage $V_S$ across a range of stack currents $I_S$. The relationship between the reactant flow and the series resistance $R_S$ is illustrated in FIG. 1 by the broken line arrow 13. However, simply decreasing the overall reactant and reaction pressures within the fuel cell system 10 may interfere with the overall system operation, for example interfering with the hydration of the ion exchange membrane and/or temperature control of the fuel cell stack. To avoid these undesirable results, the fuel cell system 10 may adjust the reactant partial pressure, as explained in more detail below.

The fuel cell stack 14 produces a stack voltage $V_S$ across a high voltage bus formed by the positive and negative voltage rails 19a, 19b. The stack current $I_S$ flows to the load 12 from the fuel cell stack 14 via the high voltage bus. As used herein, "high voltage" refers to the voltage produced by conventional fuel cell stacks 14 to power loads 12, and is used to distinguish between other voltages employed by fuel cell system 10 for control and/or communications (e.g., 5V). Thus, high voltage and is not necessarily "high" with respect to other electrical systems.

The hybrid fuel cell system 10 comprises an electrical power storage device such as a supercapacitor and/or a battery 24 electrically coupled in parallel with the fuel cell stack 14 across the rails 19a, 19b of the high voltage bus to power the load 12. The open circuit voltage of the battery 24 is selected to be similar to the full load voltage of the fuel cell stack 14. An internal resistance $R_B$ Of the battery 24 is selected to be much lower than the internal resistance of the fuel cell stack 14. Thus, the battery 24 acts as a buffer, absorbing excess current when the fuel cell stack 14 produces more current than the load 12 requires, and providing current to the load 12 when the fuel cell stack 14 produces less current than the load 12 requires. The voltage across the high voltage bus 19a, 19b will be the open circuit voltage of the battery 24 minus the battery discharging current multiplied by the value of the internal resistance $R_B$ of the battery 24. The smaller the internal resistance $R_B$ of the battery 24, the smaller the variations in bus voltage.

An optional reverse current blocking diode D1 can be electrically coupled between the fuel cell stack 14 and the battery 24 to prevent current from flowing from the battery 24 to the fuel cell stack 14. A drawback of the reverse current blocking diode D1 is the associated diode voltage drop. The fuel cell system 10 may also comprises other diodes, as well as fuses or other surge protection elements to prevent shorting and/or surges.

Fuel Cell System Control Stages

The fuel cell system 10 comprises two control stages; a first stage employing a series pass element 32 and a regulating circuit 34 for controlling current flow through the series pass element 32, and a second stage employing a controller 28 for adjusting reactant partial pressures to control the series resistance $R_S$ of the fuel cell stack 14. The first and second stages operate together, even simultaneously, in cooperation with the parallel coupled battery 24 to achieve efficient and continuous output voltage control while protecting the battery 24 and fuel cell stack 14 from damage.

The first stage is a relatively fast reacting stage, while the second stage is a slower reacting stage relative to the first stage. As discussed above, the battery 24 provides a very fast response to changes in load requirements, providing current to the load 12 when demand is greater than the output of the fuel cell stack 14 and sinking excess current when the output of the fuel cell stack 14 exceeds the demand of the load 12. By controlling the flow of current through the series pass element 32, the first stage ensures that the battery 24 is properly charged and discharged in an efficient manner without damage. By controlling the reactant partial pressures, and hence the series resistance $R_S$, the second stage controls the efficiency of the fuel cell stack 14 operation (i.e., represented as the particular polarization curve on which the fuel cell is operating). Thus, the second stage limits the amount of heat dissipated by the series pass element 32 by causing more energy to be dissipated via the fuel cell stack 14 (i.e., via less efficient operation).

Where the fuel cell stack 14 dissipates energy as heat, this energy is recoverable in various portions of the fuel cell system, and thus can be reused in other portions of the fuel cell system (i.e., cogeneration). For example, the energy dissipated as heat may be recycled to the fuel cell stack 14 via an airflow, stack coolant, or via the reactants. Additionally, or alternatively, the energy dissipated as heat may be recycled to a reformer (not shown), other portion of the fuel cell system 10, or to some external system. Additionally, limiting the amount of energy that the series pass element 32 must dissipate, can reduce the size and associated cost of the series pass element 32 and any associated heat sinks.

The details of the first and second stages are discussed in detail below.

First Stage Overview, Series Pass Element Regulator

With continuing reference to FIG. 1, the first stage of the fuel cell system 10 comprises the series pass element 32 electrically coupled between the fuel cell stack 14 and the battery 24 for controlling a flow of current $I_S$ from the fuel cell stack 14 to the battery 24 and the load 12. The first stage of the fuel cell system 10 also comprises the regulating circuit 34 coupled to regulate the series pass element 32 based on various operating parameters of the fuel cell system 10. The series pass element 32 can, for example, take the form of a field effect transistor ("FET"), having a drain and source electrically coupled between the fuel cell stack 14 and the battery 24 and having a gate electrically coupled to an output of the regulating circuit 34.

The first stage of the fuel cell system 10 comprises a number of sensors for determining the various operating parameters of the fuel cell system 10. For example, the fuel cell system 10 comprises a battery charge current sensor 36 coupled to determine a battery current $I_B$. Also for example, the fuel cell system 10 comprises a fuel cell stack current sensor 38 coupled to determine the stack current $I_S$. Further for example, the fuel cell system 10 comprises a battery voltage sensor 40 for determining a voltage $V_B$ across the battery 24. Additionally, the fuel cell system 10 may comprise a battery temperature sensor 42 positioned to determine the temperature of the battery 24 or ambient air proximate the battery 24. While the sensors 36–42 are illustrated as being discrete from the regulating circuit 34, in some embodiments one or more of the sensors 36–42 may be integrally formed as part of the regulating circuit 34.

The first stage of the fuel cell system 10 may comprise a soft start circuit 15 for slowly pulling up the voltage during startup of the fuel cell system 10. The fuel cell system 10 may also comprise a fast off circuit 17 for quickly shutting down to prevent damage to the fuel cell stack 14, for example if a problem occurs in the reactant supply system of the stack, where load must be removed quickly to prevent damage to the stack, or if a problem occurs with the second stage control.

Second Stage Overview, Reactant Partial Pressure Controller

The second stage of the fuel cell system 10 comprises the controller 28, an actuator 30 and the reactant flow regulator such as the valve 18. The controller 28 receives a value of a first voltage $V_1$ from an input side of the series pass element 32 and a value of a second voltage $V_2$ from an output side of the series pass element 32. The controller 28 provides a control signal to the actuator 30 based on the difference between the first and second voltages $V_1$, $V_2$ to adjust the flow of reactant to the fuel cell stack 14 via the valve 18 or other reactant flow regulating element.

Since the battery 24 covers any short-term mismatch between the available reactants and the consumed reactants, the speed at which the fuel cell reactant supply system 16 needs to react can be much slower than the speed of the electrical load changes. The speed at which the fuel cell reactant supply system 16 needs to react mainly effects the depth of the charge/discharge cycles of the battery 24 and the dissipation of energy via the series pass element 32.

Power Supply System

Figure 2:
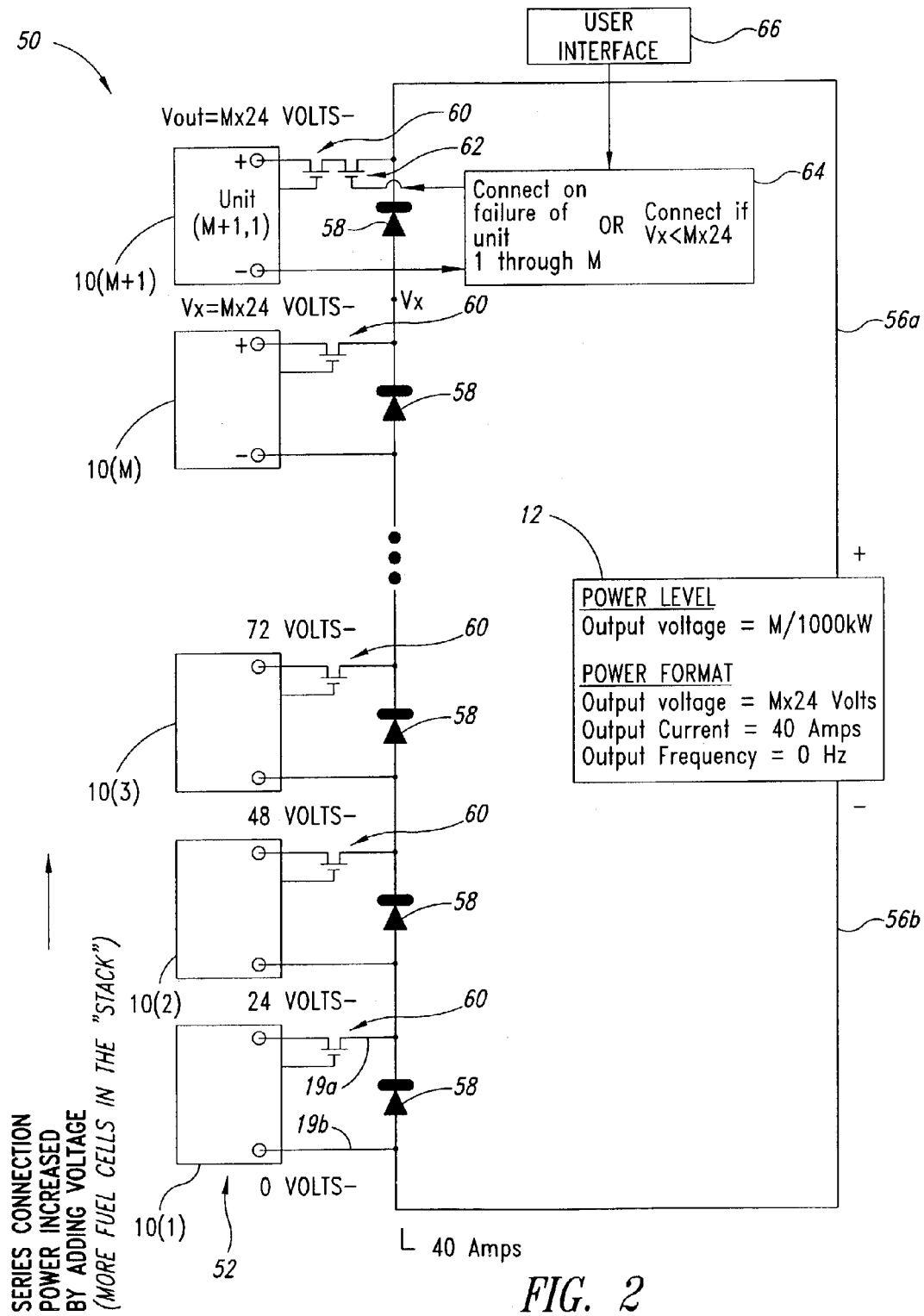
FIG. 2 is a schematic diagram of a power supply system powering a load, the power supply system including a number of individual hybrid fuel cells systems forming a one-dimensional array of fuel cell systems electrically couplable in series to provide a desired power at a desired voltage and a desired current to the load.

FIG. 2 shows one embodiment of a power supply system 50 including a one-dimensional array 52 of a fuel cells systems, collectively referenced as 10, that are electrically couplable in series to positive and negative voltage rails 56a, 56b, respectively, that form a power bus 56 for supplying power to the load 12. A respective diode, collectively referenced as 58, is electrically coupled between the positive and negative outputs of each of the fuel cell systems 10. The illustrated power supply system 50 comprises a number M+1 fuel cell systems, which are individually referenced as 10(1)–10(M+1), the number in the parenthesis referring to the position of the fuel cell system 10 in the array. The ellipses in FIG. 2 illustrate that the power supply system 50 may comprise additional fuel cell systems (not explicitly shown) between the third fuel cell system 10(3) and the $M^{th}$ fuel cell system 10(M). One or more of the fuel cell systems (e.g., 10(M+1)) may serve as a "redundant" fuel cell system, being electrically coupled in series on the power bus 56 as needed, for example, when one of the other fuel cell systems 10(1)–10(M) is faulty or when the load 12 requires additional power or voltage.

The power supply system 50 may employ one or more fault switches such as a contactor or transistor 60, that can automatically disconnect a respective fuel cell system 10 in the event of a fault or failure. For example, the fault transistor 60 may open upon a fault or failure in the fuel cell system's 10 own operating condition or upon a fault or failure in the operating condition of the power supply system 50.

The power supply system 50 may employ one or more redundancy switches, such as a contractor or transistor 62, that can manually or automatically electrically couple a respective fuel cell system 10(M+1) to the power bus 56 based on a condition other than the fuel cell system's 10(M+1) own operating condition. For example, where another fuel cell system 10 is faulty, the redundancy transistor 62 may close to electrically couple the redundant fuel cell system 10(M+1) to the power bus 56 to maintain the power, voltage and current to the load 12. Also for example, where a higher output power is desired, the redundancy transistor 62 may close to electrically couple the redundant fuel cell system 10(M+1) to the power bus 56 to adjust the power, voltage and current to the load 12.

While manual operation may be possible, the power supply system 50 may comprise control logic 64 for automatically controlling the operation of the redundancy switch (e.g., transistor 62).

The control logic 64 may receive an input from one or more of the other fuel cell systems 10(1)–10(M), the input relating to an operating condition of the respective fuel cell system 10(1)–10(M) (i.e., "connect on failure of Unit 1 through M"). For example, the control logic 64 may receive voltage, current and/or power measurements related to the fuel cell stack 14 and/or electrical power storage 24 of the fuel cell system 10. Such measurements may include, but are not limited to, stack current $I_S$, stack voltage $V_S$, battery current $I_B$, and battery voltage $V_B$, and/or temperature. Also for example, the control logic 64 may receive logical values relating to the operating condition of various systems of the fuel cell system 10, including, but not limited to, an ambient hydrogen level, an ambient oxygen level, and a reactant flow. In this respect, reference is made to commonly assigned U.S. application Ser. No. 09/916,240, filed Jul. 25, 2001 and entitled "FUEL CELL SYSTEM METHOD, APPARATUS AND SCHEDULING".

Additionally, or alternatively, the control logic 64 may receive an input from other components of the power supply system 50, such as voltage and current sensors coupled to determine a voltage or current at various points on the power bus 56. For example, the control logic 64 may receive a voltage reading corresponding to the voltage across the power bus measured at a "top" of the one-dimensional array 52, allowing the control logic 64 to indirectly detect a fault in one or more of the fuel cell systems 10 by detecting a measurement below an expected threshold value (i.e., "connect if $V_x<M\times24V$"). The threshold for detecting a fault condition may be predefined in the control logic 64 or may be set by a user or operator via a user interface 66 such as analog or digital controls, or a graphical user interface on a special purpose or general purpose computer.

Additionally or alternatively, the control logic 64 may receive an input from the user or operator via the user interface 66 which may comprise a set of user controls to set operating parameters such as power, voltage, and or current thresholds, to set desired parameters such as desired power, desired voltage or desired current nominal values, to provide electrical configuration information, to provide switching signals, and/or to signals to override the automatic operating aspects of the control logic 64. The user interface 66 may be remote from the remainder of the power supply system 50. The control logic 64 can be embodied in one or more of hardwired circuitry, firmware, micro-controller, application specific processor, programmed general purpose processor, and/or instructions on computer-readable media.

Where the output voltage of the fuel cell systems 10 can be tightly controlled, such as under the first and/or second stage operation discussed above, the series coupling of the fuel cell systems 10 is possible. Thus any desired number of fuel cell systems 10 may be electrically coupled in series to realize any integer multiple of voltage output of the individual fuel cell system 10. For example, where each fuel cell system 10 produces 24 volts across the rails 19a, 19b, three fuel cell systems 10(1)–10(3) are electrically couplable to produce 72 volts across the power bus 56. More generally stated, a number M of fuel cell systems 10 can be electrically coupled in series to produce M times the nominal fuel cell system voltage across the power bus 56. Additionally, the series coupling renders the position of the redundant fuel cell system 10(M+1) in the one-dimensional array 52 unimportant.

Figure 3:
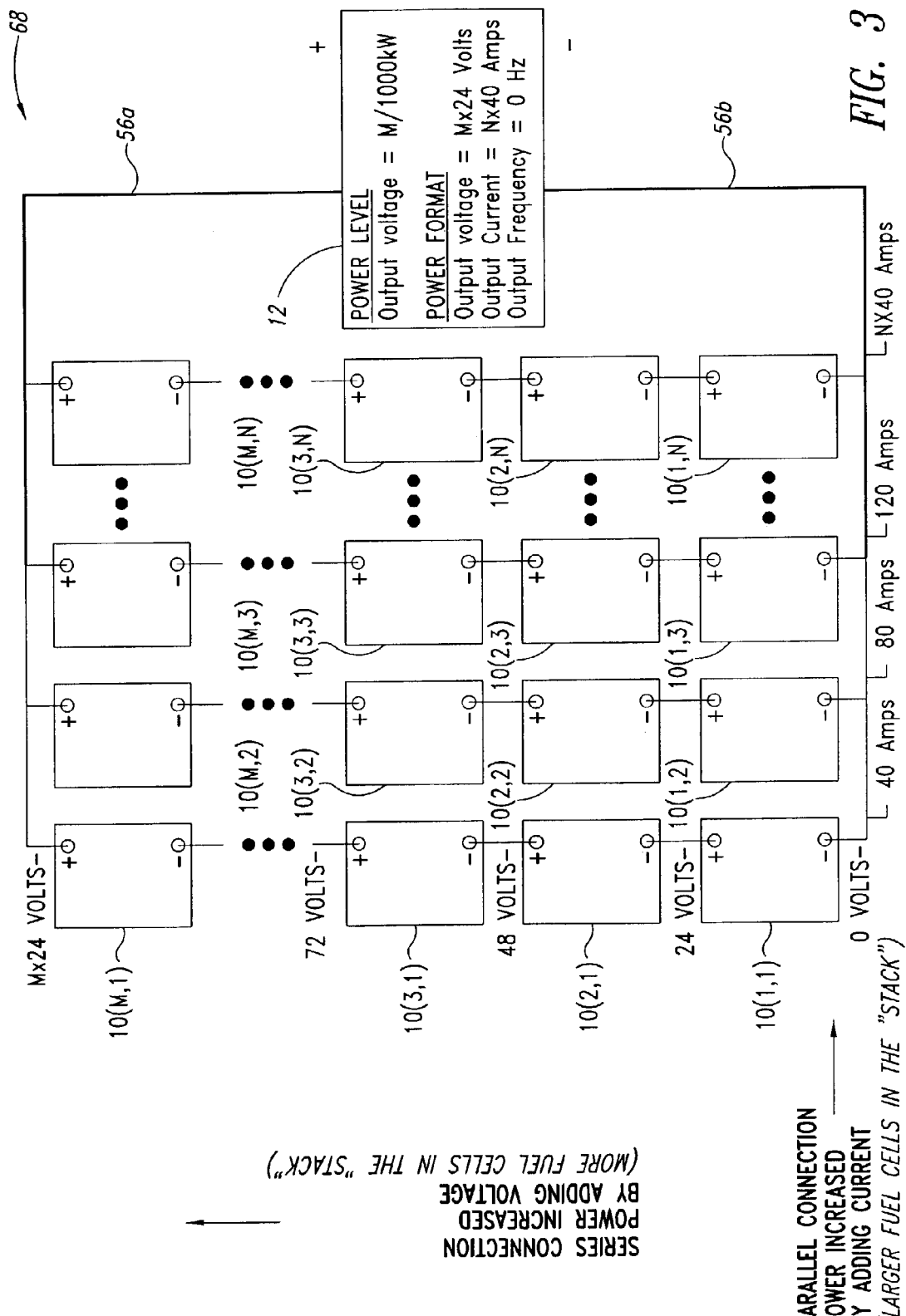
FIG. 3 is a schematic diagram of a power supply system including a number of fuel cell systems forming a two-dimensional array of fuel cell systems electrically couplable in a variety of series and parallel combinations.

FIG. 3 shows a two-dimensional array 68 of fuel cell systems 10, arranged in a number M of rows and a number N of columns for powering the load 12 via the power bus 56. The fuel cell systems 10 are individually referenced 10(1, 1)–10(M,N), where the first number in the parenthesis refers to a row position and the second number in the parenthesis refers to a column position of the fuel cell system 10 in the two-dimensional array 68. The ellipses in FIG. 3 illustrate that the various rows and columns of the two-dimensional array 68 may comprise additional fuel cell systems (not explicitly shown). The diodes 58, fault and redundancy switches 60, 62, respectively, control logic 64, and user interface 66 have been omitted from FIG. 3 for clarity of illustration.

Each of the fuel cell systems 10(1,1)–10(M,N) is individually couplable to the power bus 56 to provide a variety of desired output power, voltage or current. The fuel cell systems 10(1-M,1), 10(1-M,2), 10(1-M,3)–10(1-M,N) in each column 1-M are electrically couplable in series to one another. The fuel cell systems 10(1,1-N), 10(2,1-N), 10(3, 1-N)–10(M,1-N) in each row 1-N are electrically couplable in parallel to one another. From FIG. 3 and this description, one skilled in the art will recognize that the two-dimensional array 68 permits the series coupling of fuel cell systems 10 to adjust an output power of the power supply system 50 by adjusting an output voltage. One skilled in the art will also recognize that the two-dimensional array 68 permits the parallel coupling of fuel cell systems 10 to adjust the output power of the power supply system 50 by adjusting an output current. One skilled in the art will further recognize that the two-dimensional array 68 permits the series and parallel coupling of fuel cell systems 10 to adjust the output power of the power supply system 50 by adjusting both the output current and the output voltage. Thus, for the illustrated embodiment where each fuel cell system produces, for example, 1 kW at 24 volts and 40 amps, a maximum output power of N×M kW is possible. One skilled in the art will further recognize that the one- and two-dimensional array structures discussed herein refer to electrically couplable positions relative to one another, and do not necessary require that the fuel cell systems 54 be physically arranged in rows and/or columns.

Figure 4:
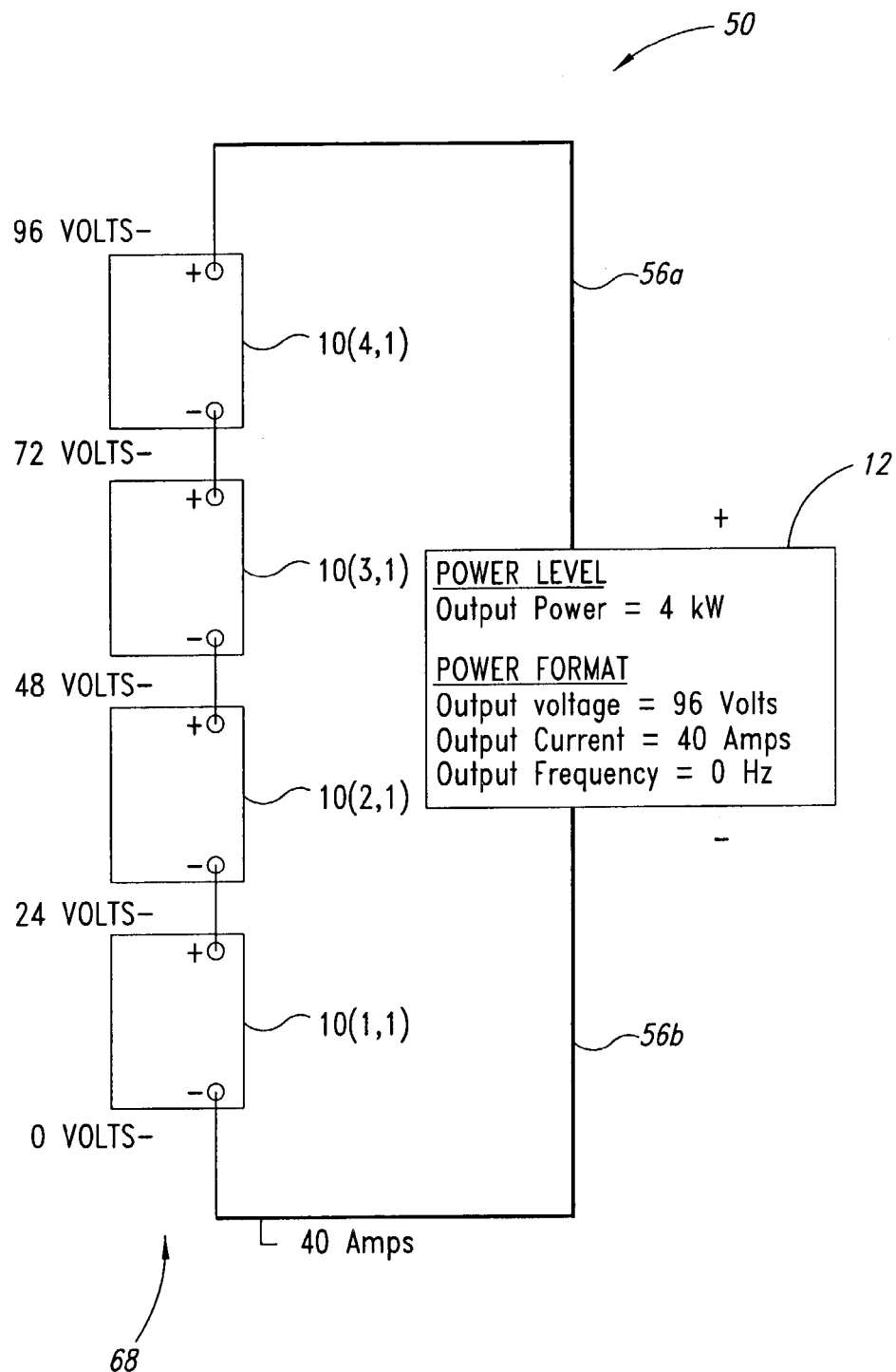
FIG. 4 is a schematic diagram illustrating a number of the fuel cell systems of FIG. 3 electrically coupled in a series combination to provide a desired output power at a first output voltage and a first output current.
Figure 5:
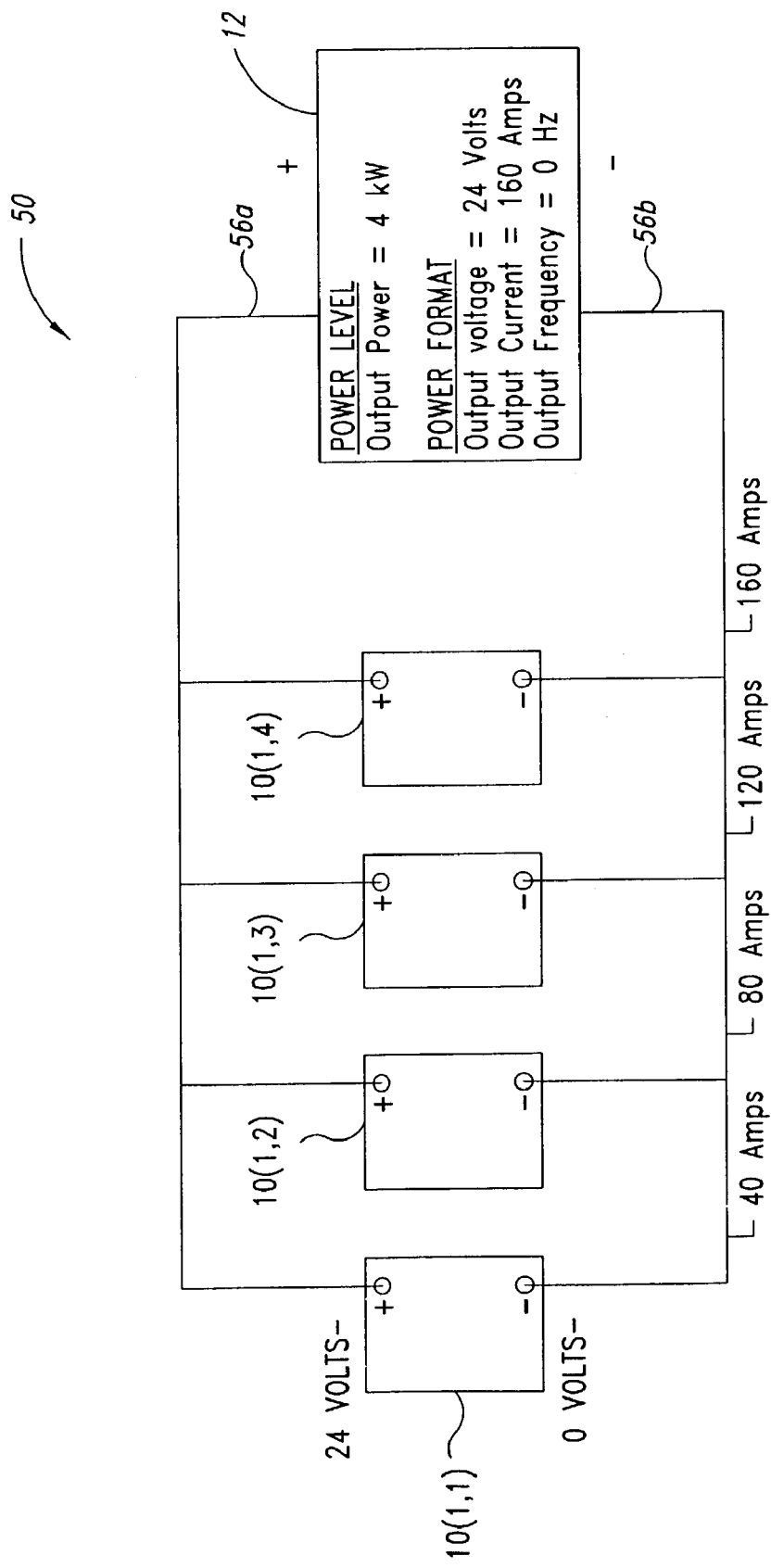
FIG. 5 is a schematic diagram illustrating a number of the fuel cell systems of FIG. 3 electrically coupled in a parallel combination to provide the desired output power at a second output voltage and a second output current.
Figure 6:
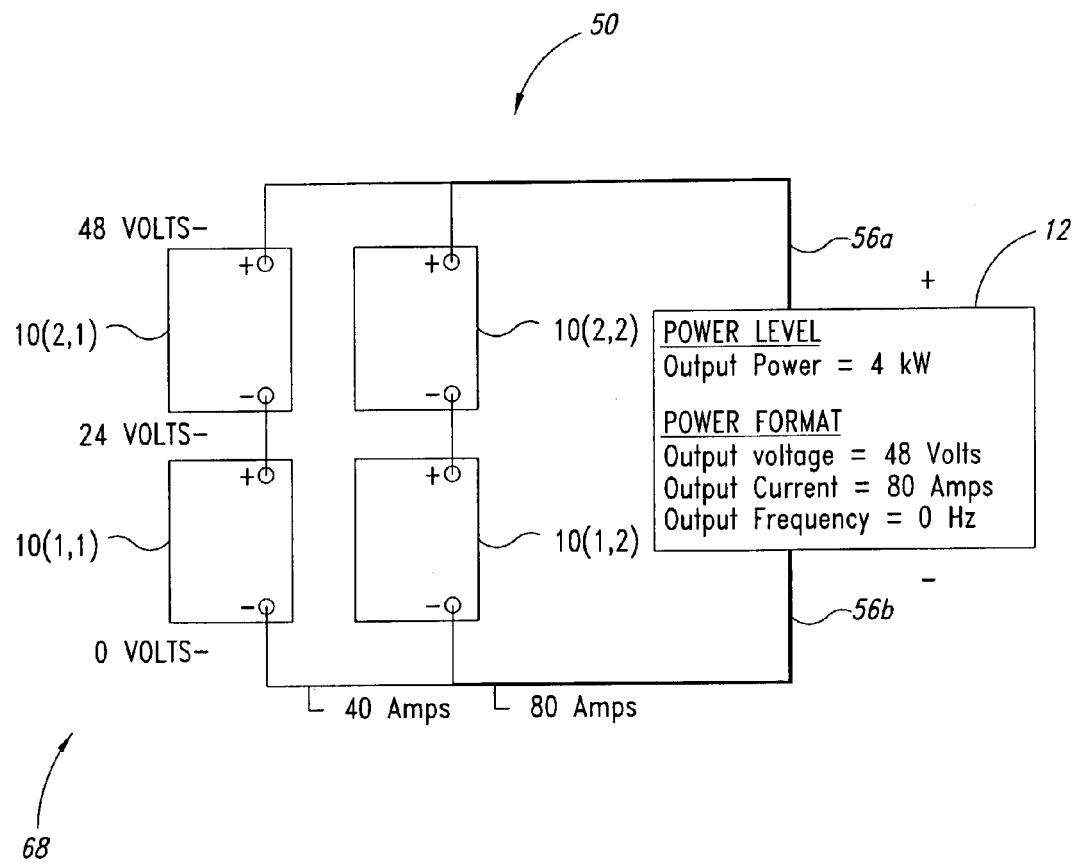
FIG. 6 is a schematic diagram illustrating a number of the fuel cell systems of FIG. 3 electrically coupled in a series and parallel combination to provide the desired output power at a third output voltage and a third output current.

FIGS. 4–6 illustrate three different electrical configurations of the fuel cell systems 10 of the two-dimensional array 68 of FIG. 3, to produce a desired output power, for example 4 kW where each fuel cell system 10 is capable of providing 1 kW at 24 volts and 40 amps. In particular, FIG. 4 shows one illustrated example employing four of the fuel cell systems 10(1,1)–10(4,1) from the first column of the two-dimensional array 68 electrically coupled in series to provide 4 kW of power at 96 volts and 40 amps. FIG. 5 shows an illustrated embodiment of four of the fuel cell systems 10(1,1)–10(1,4) of a first row of the two-dimensional array 68 electrically coupled in parallel to provide 4 kW of power at 24 volts and 160 amps. FIG. 6 shows an illustrated example employing four fuel cell systems 10(1,1), 10(1,2), 10(2,1), 10(2,2) of the two-dimensional array 68, where two pairs of series coupled fuel cell systems 10(1,1), 10(2,1) and 10(1,2), 10(2,2) are electrically coupled in parallel to produce 4 kW of power at 48 volts and 80 amps. One skilled in the art will recognize from these teachings that other combinations and permutations of electrical couplings of the fuel cell systems 10 of the two-dimensional array 68 are possible.

Reactant Supply Systems

The oxidant gas can be pure oxygen or an oxygen-containing gas, such as air. In the former case, the oxidant supply system may include a stored oxygen supply; in the latter case, air may be supplied to the stack at ambient or higher pressure. Where higher pressure operation is desired, gas compression equipment, including compressors, blowers, pumps, boosters, or ejectors, may be employed. Single- and multi-stage compression may be employed, as desired.

The fuel supply system includes hydrogen storage equipment for storing the hydrogen fuel supplied to the stacks. The fuel supply system may include a hydrocarbon fuel source and a fuel processing subsystem comprising a reformer. The fuel processing subsystem converts the fuel to a hydrogen-rich reformate gas that is supplied to the stacks.

Alternatively the hydrogen fuel may be substantially pure hydrogen. The type of hydrogen storage is not essential to the present power plant. For example, hydrogen may be stored as a pressurized gas or a liquid, if desired. Alternatively, solid hydrogen storage media may be employed, including metal hydride (e.g., nickel metal hydride), chemical hydride (e.g., borohydrides) or carbon nanomaterials. Low pressure hydrogen gas storage suffers from relatively low volumetric and gravimetric energy densities, but is relatively inexpensive and simple to implement. As the pressure of the stored hydrogen increases, volumetric and gravimetric energy density increases. Metal hydrides exhibit superior volumetric energy densities, but their weight results in significantly inferior gravimetric energy densities compared to other hydrogen storage approaches. Associated temperature regulating equipment—metal hydrides are typically cooled to facilitate hydrogen adsorption and heated to facilitate hydrogen release—and (optionally) gas pressurizing equipment can also add cost and complexity to the overall power plant. Liquid hydrogen storage exhibits good volumetric and gravimetric energy densities, but the associated temperature regulating equipment required to maintain cryogenic storage also adds cost and complexity to the power plant. In addition, liquid hydrogen storage equipment experience evaporative losses ("boil-off") over time. Thus, the choice of hydrogen storage equipment for a given application balances various factors, including the size and weight of the equipment, cost and complexity of operation. Persons skilled in the art will be aware of such considerations and can readily select suitable hydrogen storage equipment for a given application.

In some embodiments, the pressure of hydrogen in the hydrogen storage equipment exceeds the operating pressure of the stacks. For example, the stacks may operate at ambient pressure while the hydrogen storage system comprises compressed hydrogen tanks, which can store hydrogen at pressures of up to 10,000 psi (700 bar) or more. The hydrogen storage system may therefore comprise means for reducing the pressure of the hydrogen fuel from a storage pressure to a stack operating pressure. The selection of pressure reducing means is not essential to the present power plant, and any suitable pressure reducing means, including reducing valves, expanders, differential pressure regulators or expanded lines, may be employed.

Either or both of the incoming reactant streams may be humidified before being directed to the stacks. The means for humidifying the reactant stream(s) is not essential to the present power plant and operating method, and persons skilled in the art can readily select suitable such means for a given application. For example, the reactant stream(s) may be humidified in a membrane exchange humidifier that also receives the reactant exhaust from the stacks. Alternatively, a fine stream of water may be injected into the reactant stream(s). As a further example, the reactant stream(s) may be humidified by contact with hot water. Other suitable such means, including enthalpy wheels or pressure swing adsorption (PSA) units, will be apparent to persons skilled in the art. Humidification of the reactant streams is not required, however. For example, ambient air may be supplied to the stack without humidification.

System Redundancy

As discussed previously, one or more of the fuel cell systems in the present power plant (e.g., 10(M+1)) may serve as a "redundant" fuel cell system. As will be apparent to persons skilled in the art, the concept of redundancy may be applied to various other systems of the present power plant, as well.

For example, it has been disclosed that the fuel cell systems may further comprise an electrical storage device electrically coupled in parallel with the fuel cell stack across a high voltage bus to power the load. Alternatively, such an electrical storage device may be electrically coupled in parallel with the fuel cell stacks of a group of fuel cell systems. By way of illustration, in the array 68 of FIG. 3, each group of series connected fuel cell systems 10 may include one or more electrical storage devices parallel coupled to all or a portion of the constituent fuel cell stacks. Thus, each "arm" of the array may comprise one or more such electrical storage devices.

As another example, where pressurized operation is desired, the fuel cell systems of the array, or groups of them, may share common gas compression equipment; or each fuel cell system may have its own gas compression equipment. As further examples, similar considerations apply with respect to the redundancy of humidification equipment, gas supply and manifolding equipment, and control systems.

From a balance-of-plant perspective, common systems reduce cost and complexity. On the other hand, redundant systems can desirably increase reliability. Multiple systems may also provide a greater degree of control of individual fuel cell systems or portions of the array. The system configuration and degree of redundancy is not essential to the present power plant, and persons skilled in the art can readily select a suitable system configuration for a given application.

Operation

Figure 7:
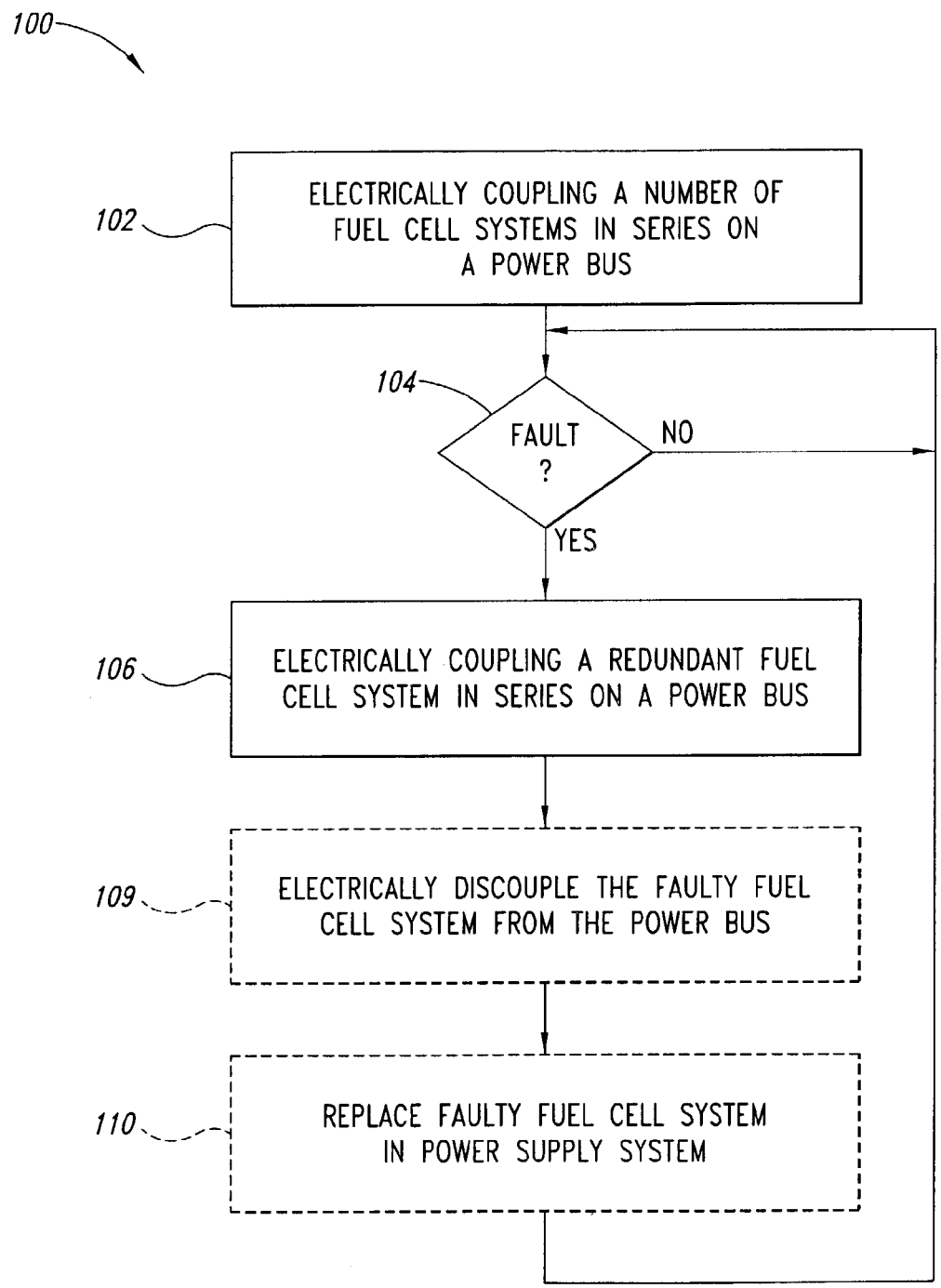
FIG. 7 is a flow diagram of a method of operating the power supply system of FIGS. 2 and 3 according to one exemplary embodiment which comprises replacing a faulty fuel cell system with a redundant fuel cell system.

FIG. 7 shows a method 100 of operating the power supply system 50 according to one exemplary illustrated embodiment, which is discussed with reference to FIG. 2. The method 100 may be embodied in the control logic 64, discussed above.

In step 102, the control logic 64 electrically couples a number M of fuel cell systems 10(1)–10(M) in series on the power bus 56 by selectively operating appropriate ones of the switches 60, 62. In step 104, the control logic 64 determines if there is a fault. For example, the control logic 64 may determine whether any of the parameters of one of the fuel cell systems 10(1)–10(M) is outside of an acceptable range, or exceeds, or falls below, an acceptable threshold. As discussed above the control logic 64 may receive voltage, current and/or power measurements related to the fuel cell stack 14 and/or electrical power storage 24 of the fuel cell system 10. Additionally, or alternatively, the control logic 64 may receive logical values relating to the operating condition of various systems of the fuel cell system 10. Additionally, or alternatively, the control logic 64 may receive an input from other components of the power supply system 50, such as voltage and current sensors coupled to determine a voltage or current at various points on the power bus 56. The control logic 64 can comprise comparison circuitry such as a comparator, or instructions for comparing the received values to defined range and/or threshold values, for example, ensuring that the total voltage across the power bus 56 is above a defined threshold or within a defined range. Alternatively, or additionally, the control logic 64 can rely on a set of logical values returned by the individual fuel cell systems 10(1)–10(M), such as a "1" or "0" corresponding to one or more operating conditions of the respective fuel cell system 10(1)–10(M).

If there is no fault, the method 100 returns to step 104, performing a monitoring loop. If there is a fault, the control logic 64 electrically couples the redundant fuel cell system 10(M+1) in series on the power bus 56 in step 106, for example, by sending an appropriate signal to the corresponding redundant switch such as by applying a signal to a gate of the redundant transistor 62. The fuel cell systems 10(1)–10(M+1) are "hot swappable" so the power supply system 50 does not have to be shutdown.

In optional step 108, the control logic 64 electrically decouples the faulty fuel cell system, for example 10(3), from the power bus 56, for example, by sending an appropriate signal to the corresponding fault switch such as by applying a signal to a gate of the fault transistor 60. In optional step 110, a user or service technician replaces the faulty fuel cell system 10(3) in the array 52 of the power supply system 50. The replacement fuel cell system 10 may serve as a redundant fuel cell system for a possible eventual failure of another fuel cell system 10.

FIG. 8 shows an optional step 112 for inclusion in the method 100. In step 112, an additional fuel cell system 10 is electrically coupled in series on the power bus 50 with one or more of the fuel cell systems 10(1)–10(M). For example, where the faulty fuel cell system 10(3) has been replaced, the replacement fuel cell system may be electrically coupled in series to increase the power output of the power supply system 50.

FIG. 9 shows an optional step 114 for inclusion in the method 100. In step 114, an additional fuel cell system 10 is electrically coupled in parallel on the power bus 52 with one or more of the fuel cell systems 10(1)–10(M). From this description, one skilled in the art will recognize that the method 100 may employ any variety of series and/or parallel combinations of fuel cell systems 10.

FIG. 10 shows a method 130 of operating the power supply system 50 according to an additional, or alternative, illustrated embodiment, which is discussed with reference to the two-dimensional array 68 of FIG. 3. Thus, the power supply system 50 may employ the method 130 in addition to, or alternatively from, the method 100.

In step 132, the control logic 64 determines at least one of a desired power, voltage and current output from the power supply system 50. The desired values may be defined in the control logic 64 or the control logic 64 may receive the desired value(s) from the user or operator by way of the user interface 66. In step 134, the control logic 64 determines an electrical configuration of series and/or parallel combinations of a number of fuel cell systems 10(1,1)–10(M,N) to provide the desired power, voltage and/or current. In step 136, the control logic 64 operates a number of the redundant switches such as a transistor 60 (FIG. 2, only one shown) to electrically couple respective ones of fuel cell systems 10(1,1)–10(M,N) into the determined electrical configuration.

The above description shows that any number of fuel cell systems 10 are electrically couplable in series and/or parallel combinations to form a combined power supply system 50 for powering the load 12 at a desired voltage and current.

The fuel cell systems 10 can take the form of any of the fuel cell systems discussed above, for example, the fuel cell system 10 illustrated in FIG. 1. As discussed above, the power supply system 50 takes advantage of a matching of polarization curves between the fuel cell stacks 14 and the respective electrical power storage 24 to allow series coupling of fuel cell systems. One approach to achieving the polarization curve matching includes the first stage regulating scheme generally discussed above. Another approach includes controlling a partial pressure of one or more reactant flows based on a deviation of a voltage across the electrical power storage 24 from a desired voltage across the electrical power storage 24. A further approach includes controlling a partial pressure of one or more reactant flows based on a deviation of an electrical storage charge from a desired electrical storage charge. The electrical power storage charge can be determined by integrating the flow of charge to and from the electrical power storage 24. Other approaches may include phase or pulse switching regulating or control schemes. Reasons for employing a series configuration include the cost advantage, and the configuration having the highest efficiency at the full output power point if the stack voltage equals the battery float voltage at that point, e.g., efficiency can exceed 97% in a 24V system with no R.F. noise problem. While the fuel cell systems 10 are illustrated having two stages, in some embodiments the power supply system 50 may incorporate one or more fuel cell systems 10 having only one of the stages, either the first or the second stage.

Figure 11:
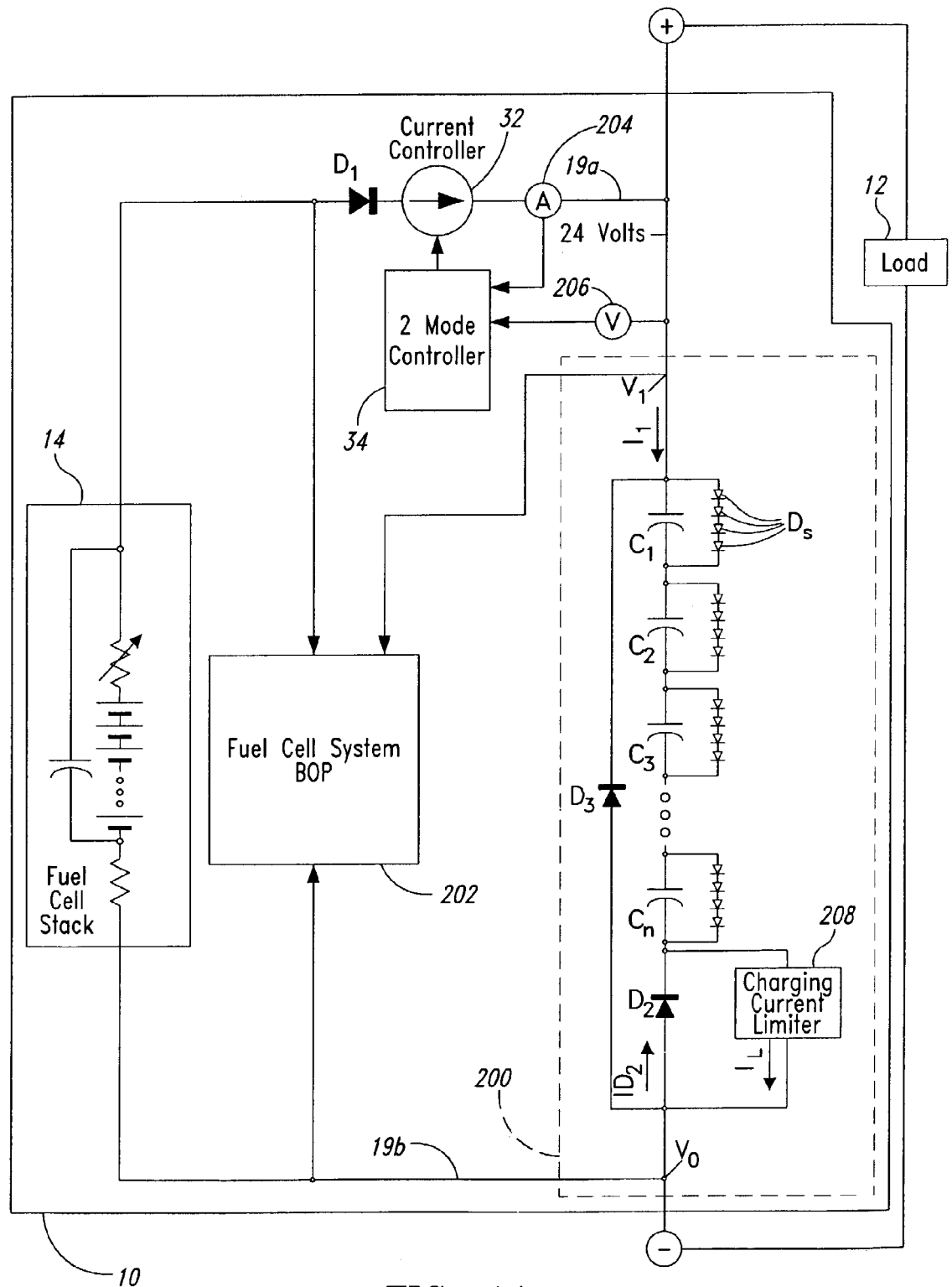
FIG. 11 is a schematic diagram of a hybrid fuel cell system powering a load, the fuel cell system having a fuel cell stack, a series pass element, a regulating circuit or controller for controlling current flow through the series pass element, and an ultracapacitor based circuit as an electrical power storage device that simulates a battery (ultracapacitor battery simulator).

FIG. 11 shows another embodiment of a hybrid fuel cell system 10 operable to power an external load 12. In contrast to the previously discussed embodiments, the fuel cell system 10 of FIG. 11 employs an ultracapacitor battery simulator circuit 200 as an electrical power storage device 24 (FIG. 1), the ultracapacitor battery simulator circuit 200 being configured to simulate a battery.

The fuel cell system 10 may comprise one or more internal loads 202, which represent the various active components of the fuel cell system 10, for example, processors, sensors, indicators, valves, heaters, compressors, fans, and/or actuators such as solenoids. These internal loads 202 are typically referred to as the "balance of system" or "balance of plant" (BOP). The internal loads 202 are electrically coupled to receive power from the fuel cell stack 14 via the power bus 19a, 19b. The fuel cell system 10 may also comprise one or more current sensors 204 and voltage sensors 206.

The ultracapacitor battery simulator circuit 200 comprises a number of ultracapacitors $C_1$–$C_n$ electrically coupled in series between the rails 19a, 19b of the voltage bus. A charging current limiter 208 is electrically coupled in series with the ultracapacitors $C_1$–$C_n$ to limit charging current to the ultracapacitors $C_1$–$C_n$. A bypass diode $D_2$ is electrically coupled across the charging current limiter 208 to provide a path for discharge current which bypasses the charging current limiter 208. A reverse charging diode $D_3$ prevents the ultracapacitors $C_1$–$C_n$ from charging in the reverse direction, for example, when connected in series with other electrical power storage devices 24 or hybrid fuel cell systems 10.

A number of surge diodes $D_S$ are electrically coupled across respective ones of the ultracapacitors $C_1$–$C_n$. The surge diodes $D_S$ equalize the voltage across each of the ultracapacitors $C_1$–$C_n$ during charging, and thus may limit the voltage across any ultracapacitor $C_1$–$C_n$ to the surge rating of the ultracapacitor $C_1$–$C_n$. For example, typical ultracapacitors $C_1$–$C_n$ may have a working voltage of approximately 2.5 volts. As illustrated, the ultracapacitors $C_1$–$C_n$ may be connected in series to achieve higher working voltages. Thus, for example, four surge diodes $D_s$ electrically coupled across respective ultracapacitors $C_1$–$C_n$ may limit the voltage across the respective ultracapacitor $C_1$–$C_n$ to approximately 2.8 volts, which is the typical surge rating of the ultracapacitors $C_1$–$C_n$.

The bypass diode $D_2$ is selected such that if the voltage on the capacitor bank (i.e., the series coupled ultracapacitors) rises above the point where all of the ultracapacitors $C_1$–$C_n$ have approximately 2.8 volts across them, and all surge diodes $D_S$ turn ON, the voltage drop across the current limiter 208 will rise to limit the current through the surge diodes $D_s$ and prevent a short circuit.

Figure 12:
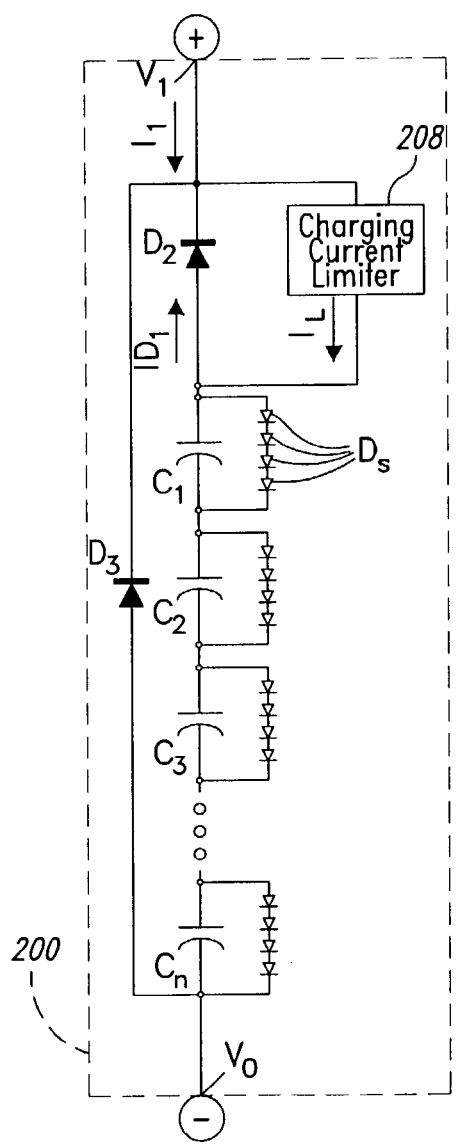
FIG. 12 is a schematic diagram of an alternative ultracapacitor based circuit suitable for use in the fuel cell system of FIG. 11.
Figure 13:
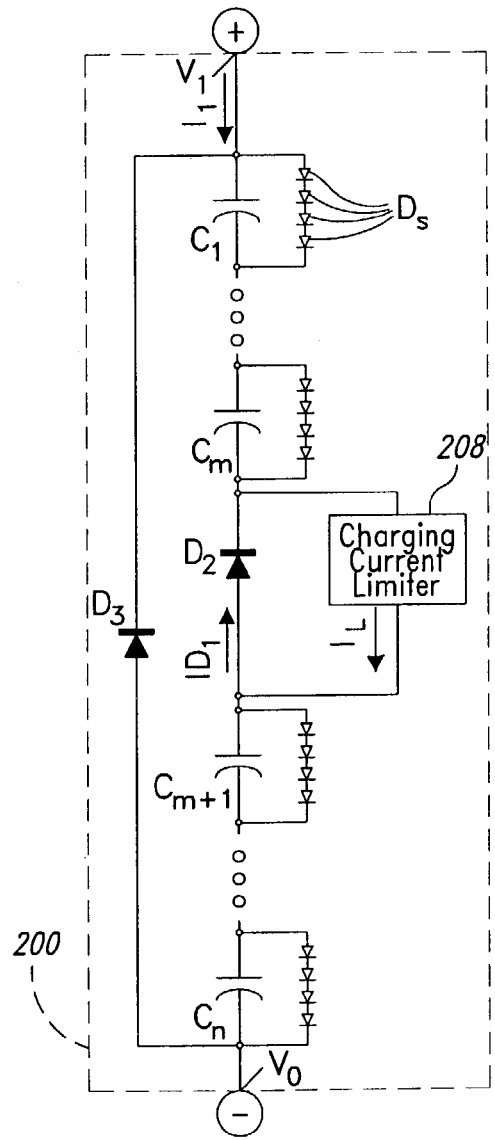
FIG. 13 is a schematic diagram of a further alternative ultracapacitor based circuit suitable for use in the fuel cell system of FIG. 11.

FIG. 11 shows the charging current limiter 208 and bypass diode $D_2$ positioned at one end of the string of ultracapacitors $C_1$–$C_n$. FIG. 12 shows the charging current limiter 208 and bypass diode $D_2$ positioned at the other end of the string of ultracapacitors $C_1$–$C_n$. FIG. 13 shows the charging current limiter 208 and bypass diode $D_2$ positioned between the ends of the string of ultracapacitors $C_1$–$C_n$. Thus, it is apparent that the charging current limiter 208 and bypass diode $D_2$ may be positioned at either end, or anywhere in the string of ultracapacitors $C_1$–$C_n$.

Figure 14:
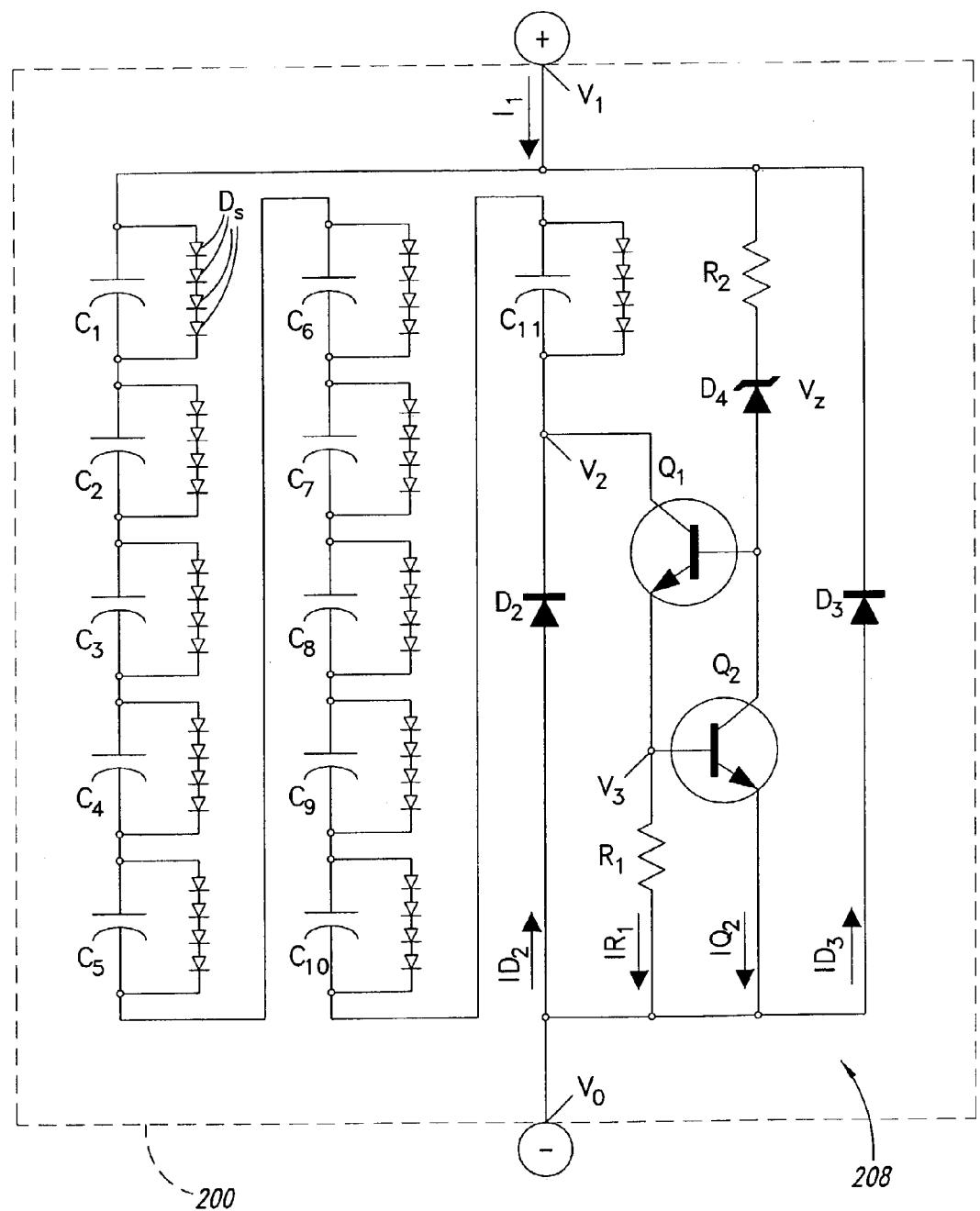
FIG. 14 is an electrical schematic diagram of an ultracapacitor based circuit comprising a string of ultracapacitors electrically coupled in series, a linear mode charging current limiter, and a bypass diode.

FIG. 14 shows one embodiment of the charging current limiter 208 in the form of a linear mode charging current limiter. The charging current limiter 208 comprises a charging current limiting transistor $Q_1$, feed back transistor $Q_2$. first resistor $R_1$, second resistor $R_2$ and Zener diode $D_4$. The charging current limiting transistor $Q_1$ comprises a pair of active terminals (e.g., collector and emitter) and a control terminal (e.g., base), the active terminals electrically coupled in series with the ultracapacitors $C_1$–$C_n$. The feedback transistor $Q_2$ comprises a pair of active terminals (e.g., collector and emitter) and a control terminal (e.g., base), the active terminals electrically coupled between rails 19a, 19b and the control terminal electrically coupled to the emitter of the charging current limiting transistor $Q_1$. The first resistor $R_1$ is electrically coupled between the control terminal of the feedback transistor $Q_2$ and one rail 19b of the voltage bus. The second resistor $R_2$ and Zener diode $D_4$ are electrically coupled between the control terminal of the charging current limiting transistor $Q_1$ and the other rail 19a of the voltage bus.

In use, the linear mode charging current limiter 208 passes charging current when the terminal voltage $V_1$–$V_0$ is above some defined threshold voltage. When a voltage greater than the sum of the Zener voltage of Zener diode $D_4$ and the voltage required to turn ON the charging current limiting transistor $Q_1$ (e.g., approximately 0.7 volts) is applied to the terminals of the ultracapacitor battery simulator circuit 200, current will begin to flow into the control terminal of the charging current limiting transistor $Q_1$. This causes current to flow into the collector of the charging current limiting transistor $Q_1$, and begins charging the bank of ultracapacitors $C_1$–$C_n$. When the current from the emitter of the charging current limiting transistor $Q_1$ is sufficiently high to cause approximately 0.7 volts across the first resistor $R_1$, the feedback transistor $Q_2$ begins to turn ON. This reduces the current through the charging current limiting transistor $Q_1$. In this way, the charging current of the bank of ultracapacitors $C_1$–$C_n$ is limited to approximately 0.7 volts divided by the value of the first resistor $R_1$. For example, if the first resistor $R_1$ is approximately 0.175 ohms, then the charging current would be limited to approximately 4 amps.

The circuit configuration of FIG. 14 also minimizes the current drawn from the ultracapacitors $C_1$–$C_n$ when storing charge (i.e., when not on float charge). When a voltage less than the sum of the Zener voltage of Zener diode $D_4$ (e.g., approximately 24 volts) and the voltage required to turn ON the charging current limiting transistor $Q_1$ (e.g., approximately 0.7 volts) is applied to the terminals of the ultracapacitor battery simulator circuit 200, no current will be drawn from the ultracapacitors $C_1$–$C_n$, which will consequently maintain their charge for relatively long intervals.

Figure 15:
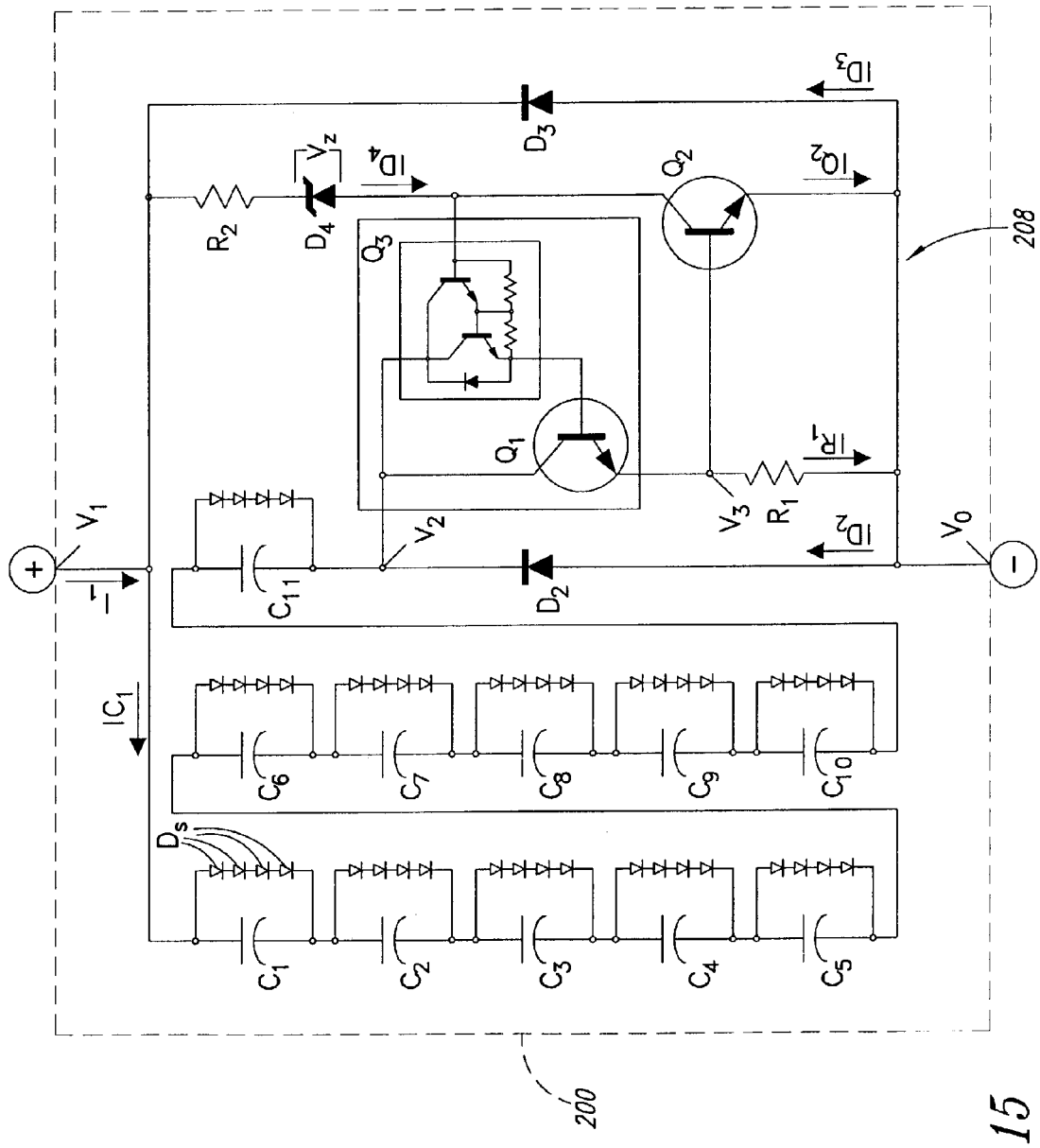
FIG. 15 is an electrical schematic diagram of the ultracapacitor based circuit of FIG. 14 where the charging current limiter further comprises a pair of Darlington coupled transistors to limit power loss.

FIG. 15 shows another embodiment of the charging current limiter 208, adding a pair of transistors, pair of resistors and diode, coupled in a Darlington circuit configuration $Q_3$, to the embodiment of FIG. 14. The Darlington circuit $Q_3$ is electrically coupled between the base of the charging current limiting transistor $Q_1$ and the Zener diode $D_4$, reducing the current $I_{D3}$ flowing through the second resistor $R_2$ and the Zener diode $D_4$. While slightly more complicated than the embodiment of FIG. 14, the configuration of FIG. 15 reduces power lost through the second resistor $R_2$ and Zener diode $D_3$.

Figure 16:
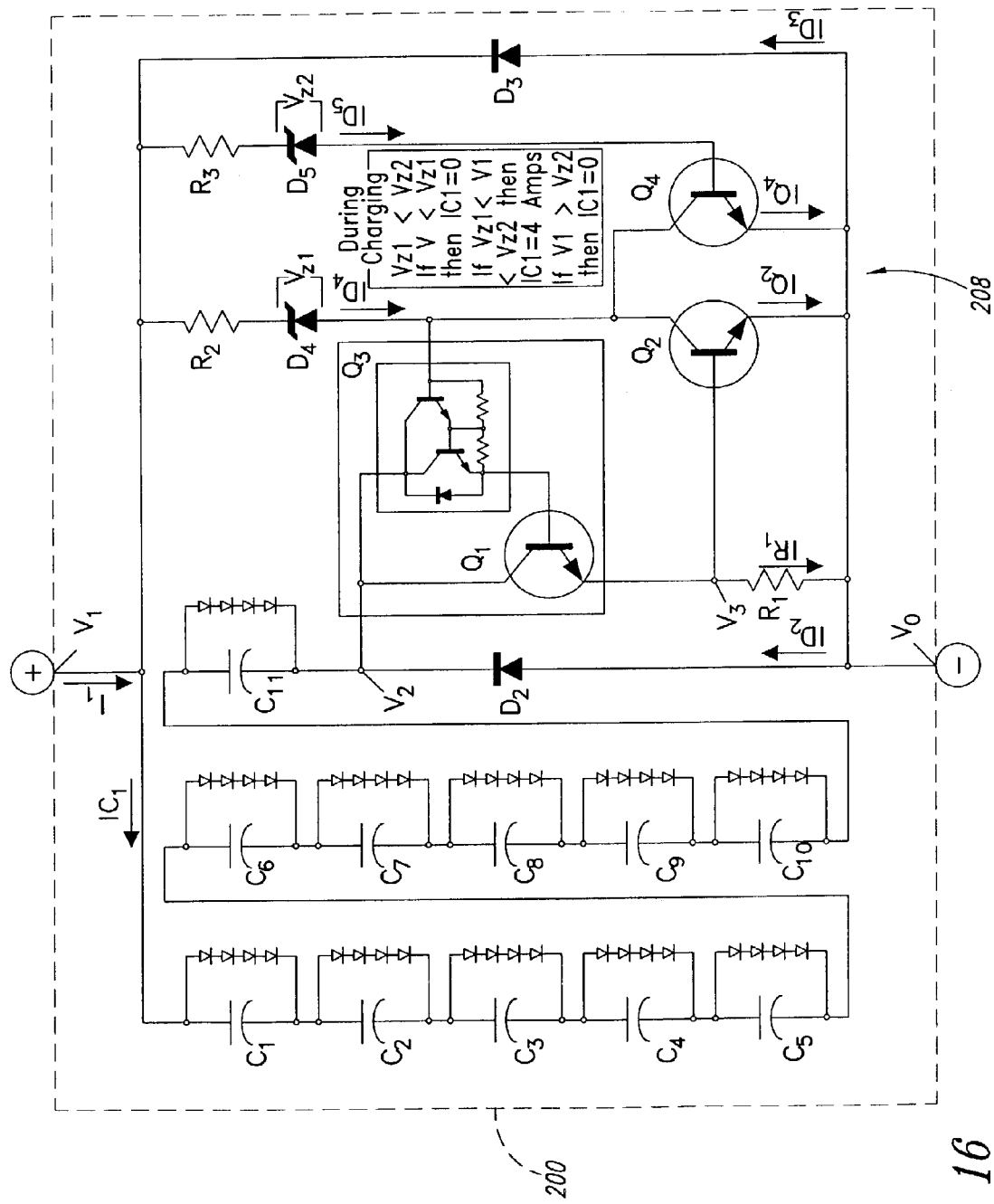
FIG. 16 is an electrical schematic diagram of the ultracapacitor based circuit of FIG. 15 where the charging current limiter further comprises circuitry to cut off the charging current in the event of an over voltage condition.

FIG. 16 shows a further embodiment of the charging current limiter 208, that adds over voltage circuitry that cuts off the charging current in an over voltage situation, to the embodiment of FIG. 15. The over voltage circuitry comprises an over voltage transistor $Q_4$, over voltage Zener diode $D_5$, and over voltage resistor $R_3$. The emitters of the over voltage transistor $Q_4$ and feed back transistor $Q_2$ are commonly coupled, and the collectors of the over voltage transistor $Q_4$ and feed back transistor $Q_2$ are also commonly coupled. The over voltage Zener diode $D_5$ and over voltage resistor $R_3$ are electrically coupled between the base of the over voltage transistor $Q_4$ and one rail of the voltage bus.

When the terminal voltage of the bank of ultracapacitors $C_1$–$C_n$ exceeds a sum of the Zener voltage of the Zener diode $D_5$ (e.g., approximately 30 volts) and the voltage required to turn ON the over voltage transistor $Q_4$ (e.g., approximately 0.7 volts), the over voltage transistor $Q_4$ turns OFF both the feedback transistor $Q_2$ and charging current limiting transistor $Q_1$, thus preventing further charging current from entering the ultracapacitors $C_1$–$C_n$. Although the over voltage cutoff is not a feature inherent in batteries, it is desirable in a hybrid fuel cell system to account for the rise in voltage of the fuel cell stack 14 in no load conditions (e.g., open circuit voltage or OCV). The embodiment of FIG. 16 also has the advantage of limiting the heat produced by the charging current limiting transistor $Q_1$ and consequently the size of any associated heat sink.

Figure 17:
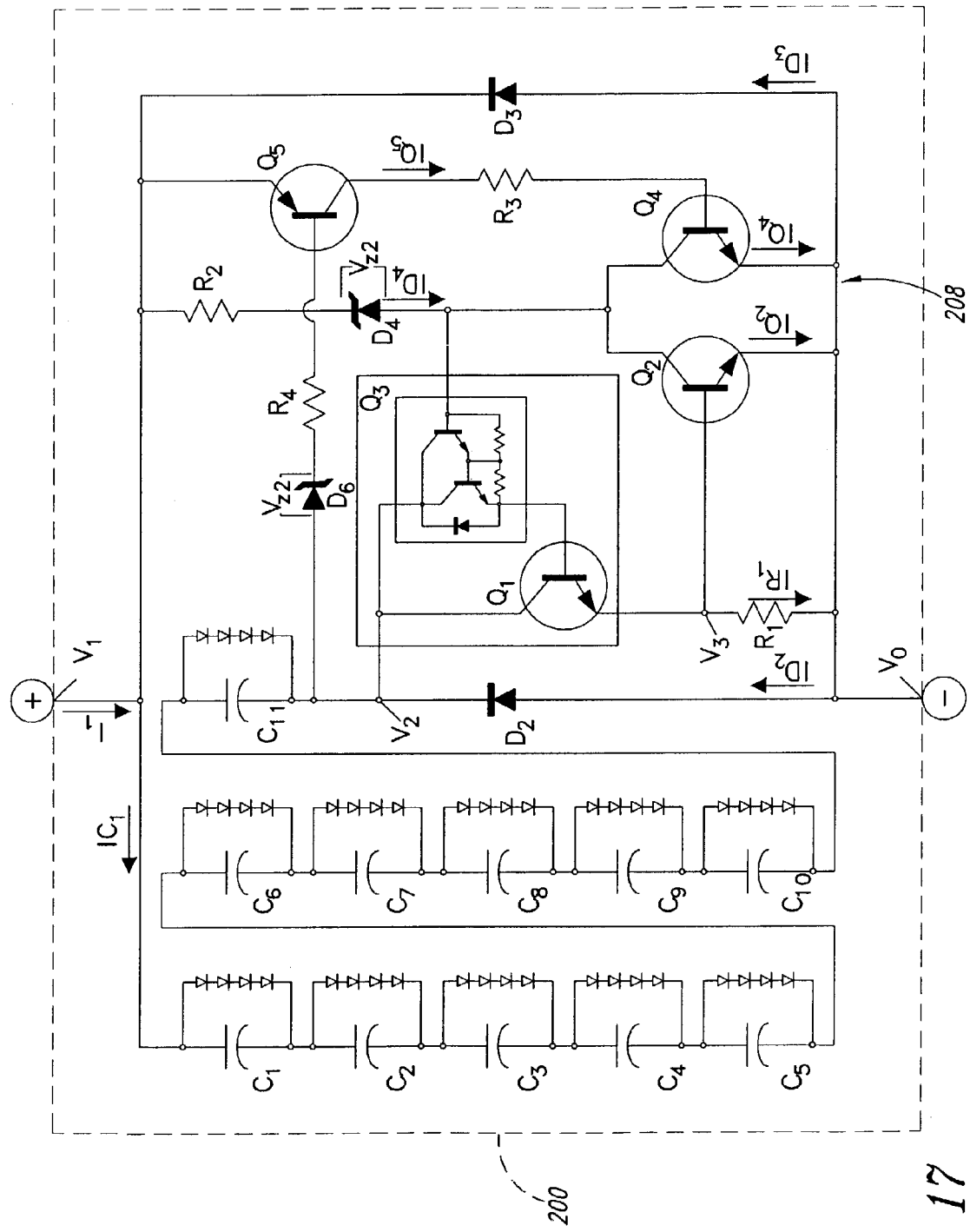
FIG. 17 is an electrical schematic diagram of the ultracapacitor based circuit of FIG. 16 where the charging current limiter further comprises circuitry to cut off charging current when a desired voltage is obtained across the ultracapacitors.

FIG. 17 shows yet a further embodiment of the charging current limiter 208, that adds circuitry to cut off charging current when the bank of ultracapacitors $C_1$–$C_n$ reaches a desired voltage, to the embodiment of FIG. 16. The circuitry comprises a voltage setting transistor $Q_5$, voltage setting Zener diode $D_6$, and voltage setting resistor $R_4$. Active terminals of the voltage setting transistor $Q_5$ are electrically coupled between the base of the over voltage transistor $Q_4$ and the rail of the voltage bus. The voltage setting Zener diode $D_6$ and voltage setting resistor $R_4$ are electrically coupled between the base of the voltage setting transistor $Q_5$ and the bank of ultracapacitors $C_1$–$C_n$. The embodiment of FIG. 17 has the advantage of limiting the heat produced by the charging current limiting transistor $Q_1$ and consequently the size of any heat sink associated. The embodiment of FIG. 17 also saves power and improves overall system efficiency.

The embodiments of FIGS. 11–17 are compatible with, and complimentary to, previously discussed concepts, any may also be employed with black start techniques discussed in commonly assigned U.S. application Ser. No. 10/388,191, filed Mar. 12, 2003 and titled "BLACK START METHOD AND APPARATUS FOR A FUEL CELL POWER PLANT, AND FUEL CELL POWER PLANT WITH BLACK START CAPABILITY".

In the embodiments of FIGS. 11–17, the fuel cell system 10 behaves as a two-mode power supply. The output is controlled by two settings: 1) an output current limit; and 2) an output voltage limit. When the load resistance is high enough to draw a current lower than the output current limit, the fuel cell system 10 acts as a constant voltage source to set the output voltage limit. When the load resistance is low enough to draw a current higher than the output current limit at the output voltage limit set point, the fuel cell system 10 acts as a constant current source set to the output current limit. Charging current limiting is handled by the ultracapacitor battery simulator circuit 200, rather than via the series pass element 32 (FIG. 1) in battery charging current limit mode discussed in reference to FIG. 1. It would be advantageous to incorporate the charging current limiting in other electrical power storage device circuitry, even where the electrical power storage device comprises a battery rather than an ultracapacitor, since this would prevent the in rush of current when, for example, a dead or discharged battery is plugged into a system with charged batteries.

For a fuel cell system 10 employing a Ballard Nexa™ fuel cell stack, the output voltage limit would be set at or below the open circuit voltage (OCV) of the fuel cell stack 14 (e.g., approximately 54.8 volts), and the output current limit would be set such that the fuel cell stack current limit and the fuel cell system's thermal limits were not exceeded. For example, if the output power limit is 1.3 kW, the output current limit would be approximately 23.7 amps.

The ultracapacitor battery simulator circuit 200 acts as a DC/DC converter. The balance of plant 202 (FIG. 11) is typically run on 24 VDC derived from the output of the ultracapacitor battery simulator circuit 200, rather than directly from the stack voltage.

The ultracapacitor battery simulator circuit 200 may have an input voltage range of 55 volts (at OCV) to 25.5 volts (at full load). If the input voltage (i.e., stack voltage) falls below 25.5 volts, the ultracapacitor battery simulator circuit 200 may lower its output current limit to the point where the input voltage does not go any lower. If the input current (i.e., stack current) rises to 48 amps, the ultracapacitor battery simulator circuit 200 may lower its output current limit to the point where the input current would not any higher.

Figure 18:
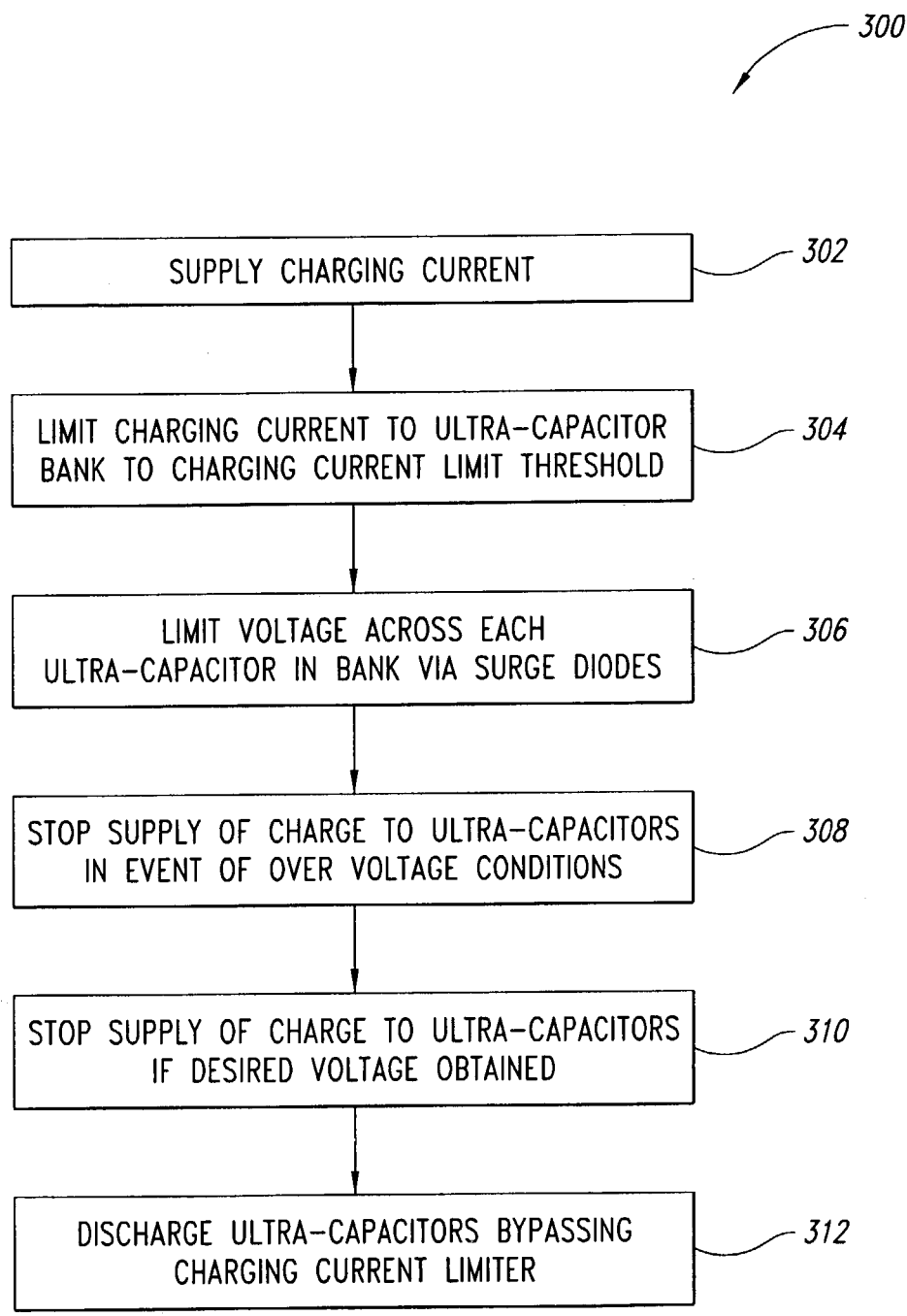
FIG. 18 is a flow diagram of one illustrated method of operating a hybrid fuel cell system.

FIG. 18 shows a method 300 of operating a fuel cell system 10 employing an ultracapacitor battery simulator circuit 200 according to one illustrated embodiment. In step 302, charging current is supplied, for example, from the fuel cell stack 14. In step 304, the charging current limiting transistor $Q_1$ and feedback transistor $Q_2$ limit charging current supplied to the ultracapacitors $C_1$–$C_n$ below a charging current limit threshold. In step 306, the surge diodes $D_S$ limit the voltage across each of the ultracapacitors $C_1$–$C_n$. In step 308, the over voltage transistor $Q_4$ stops the supply of charging current to the ultracapacitors $C_1$–$C_n$ in the event of an over voltage condition. In step 310, the voltage setting transistor $Q_5$ stops the supply of charging current to the ultracapacitors $C_1$–$C_n$ if the desired voltage across the bank of ultracapacitors $C_1$–$C_n$ has been attained. In step 312, the ultracapacitors $C_1$–$C_n$, discharge via the bypass diode $D_2$, bypassing the charging current limiter 208.

Figure 19:
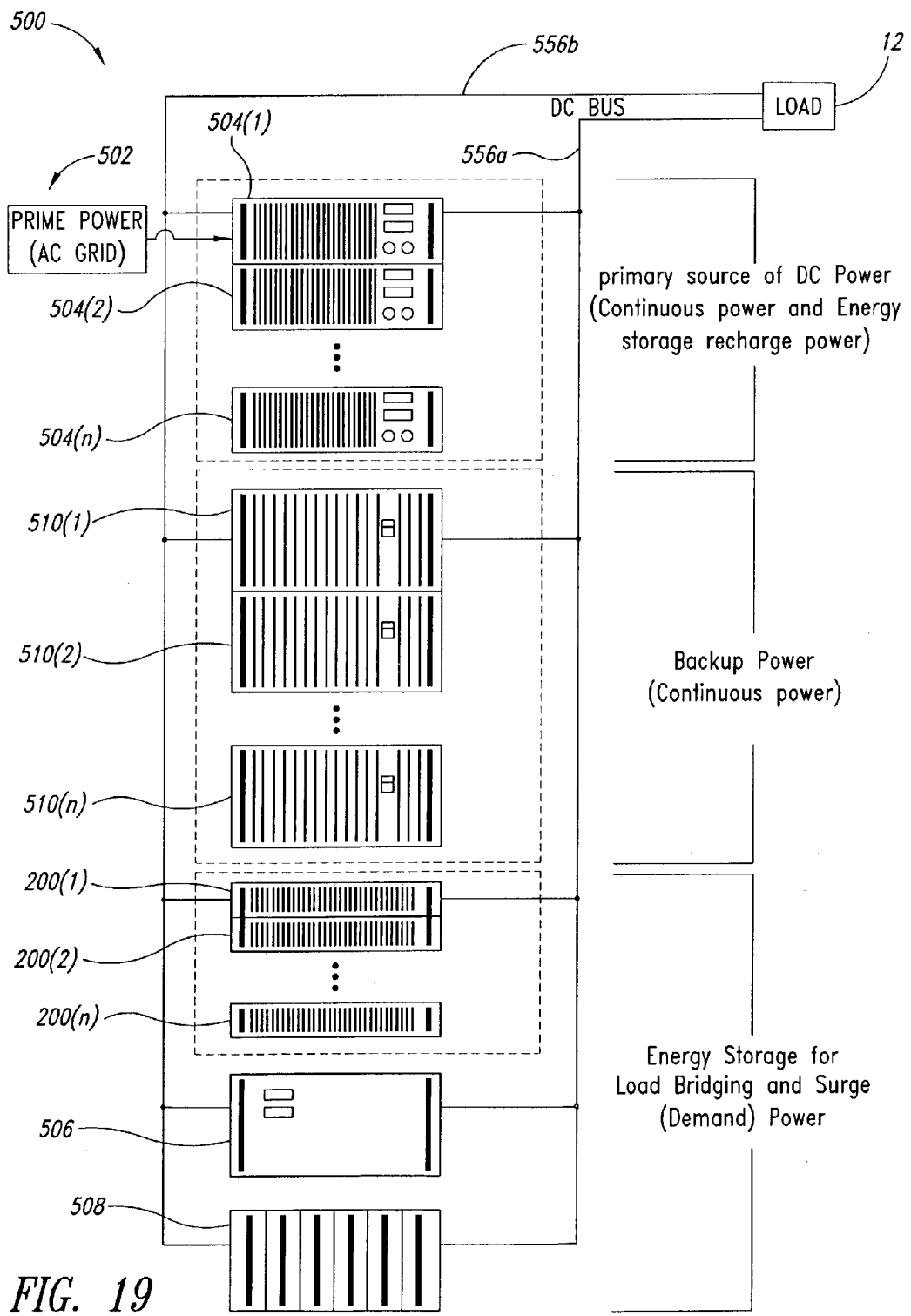
FIG. 19 is a schematic diagram of a power system comprising one or more rectifier arrays, fuel cell hybrid module arrays, ultracapacitor battery simulator arrays, flywheel battery simulator arrays and/or rechargeable batteries.

FIG. 19 shows a power system 500 for supplying power to a load 12 via rails 556a, 556b of a DC bus. The power system 500 receives power from a power grid 502, typically in the form of three-phase AC power. The power system 500 comprises one or more rectifier arrays 504(1)–504(n), which receive the AC power from the power grid 502 and rectify the power. The rectified power may be supplied to the load 12 via the DC bus 556a, 556b. The array of rectifiers 504(1)–504(n) serves as a primary source of DC power to continuously power the load 12, and to recharge a variety of electrical power storage devices 24.

The power system 500 includes an array of one or more fuel cell hybrid modules 510(1)–510(n). The array of fuel cell hybrid modules 510(1)–510(n) provide continuous backup power to the load 12 via the DC bus 556a, 556b, for example, in the event of an interruption of the power grid 502.

The power system 500 may also include an array of one or more ultracapacitor battery simulators 200(1)–200(n) that may store energy for load bridging and providing surge (i.e., demand) power. Additionally, or alternatively, the power system 500 may include a fly wheel battery simulator 506, that may store energy for load bridging and providing surge power. The fly wheel battery simulator 506 may employ circuitry similar to that described for the ultracapacitor battery simulator 200. Additionally, or alternatively, the power system 500 may include one or more rechargeable batteries 508 that store energy for load bridging and providing surge power. These electrical power storage devices may supply power to the load 12 via the DC bus formed by rails 556a, 556b.

Figure 20:
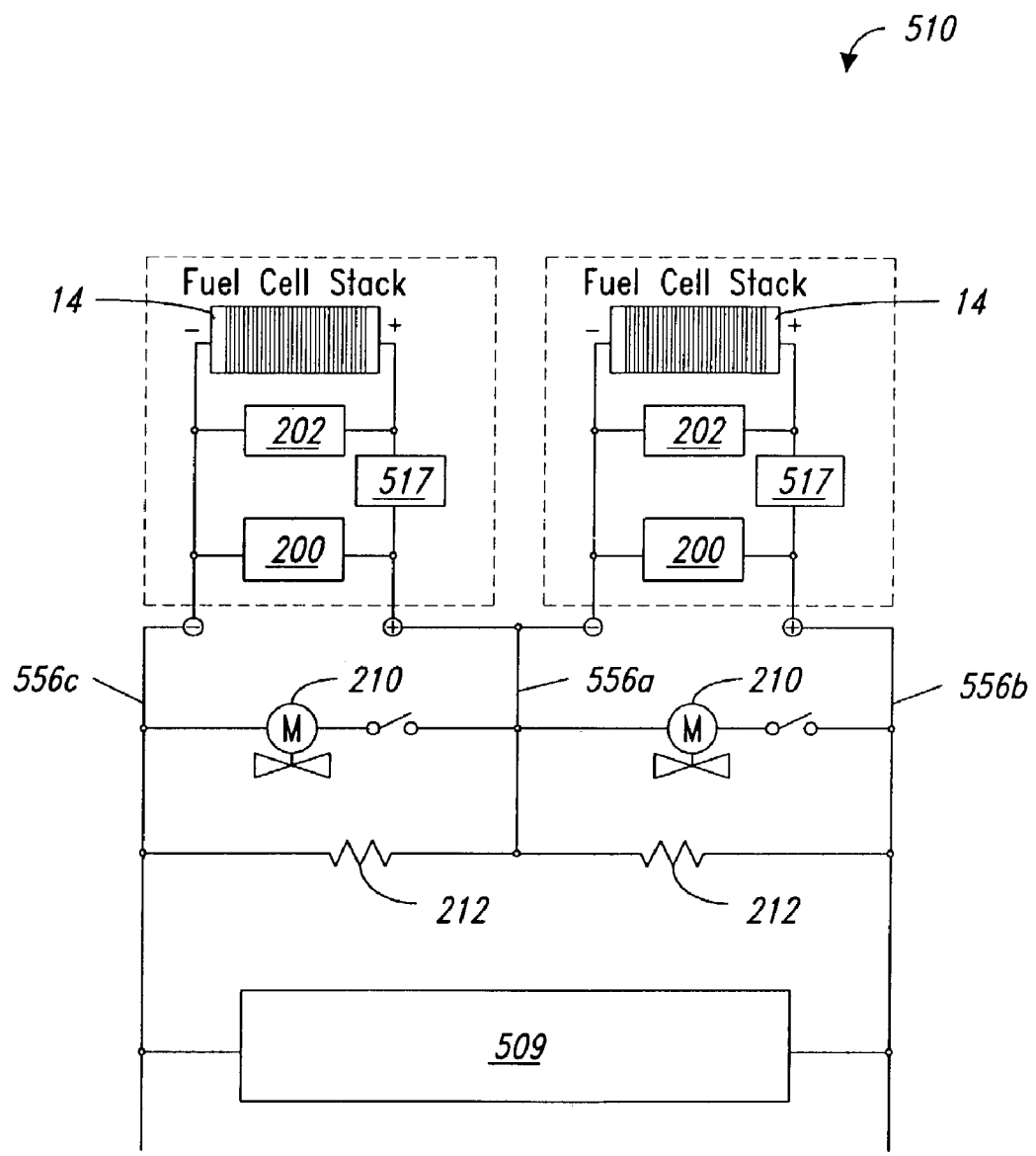
FIG. 20 is a schematic diagram of one illustrated embodiment of a fuel cell hybrid module array suitable for use with the power system of FIG. 19.

FIG. 20 shows a fuel cell hybrid module array 510, suitable for use in the power system 500 of FIG. 19. The fuel cell hybrid module array 510 includes first and second fuel cell stacks 14 electrically coupled in series and associated balance of plant 202, regulator 517 (e.g., series pass element 32 and regulating circuit 34 of FIGS. 1 and 11) and an ultracapacitor battery simulator array 200. The fuel cell hybrid module array 510 may also include a electrical power storage device 509, such as ultracapacitor battery simulators 200(1)–200(n), fly wheel battery simulator 506, or rechargeable batteries 508 of FIG. 19. The ultracapacitor battery simulator arrays 200 provide dynamic response for the fuel cell hybrid modules, supplying and absorbing current quickly in response to load requirements, while stacks 14 and balance of plants 202 respond more slowly. Electrical power storage device 509 provides energy for load bridging and providing surge power. This configuration may permit a smaller number of ultracapacitors to be used in battery simulator arrays 200 than would be the case if they were also required to provide load bridging and surge capacity. In some embodiments, in turn, this may result in an overall reduction in the number of ultracapacitors employed in the power plant.

Auxiliary devices, such as hydrogen supply solenoid valves 210 (or ventilation fans or flow switches (not shown)), can be powered from center bus 556a. One or more equalizing circuits may be employed to aid in system startup by balancing the load to provide a reference. The equalizing circuits may take the form of a string of resistors 212 between bus 556a, 556b and 556c. Other active or passive means of balancing the load on center bus 556a may also be employed, if desired, such as an active controller that shares a load to maintain a particular voltage level.

Figure 21:
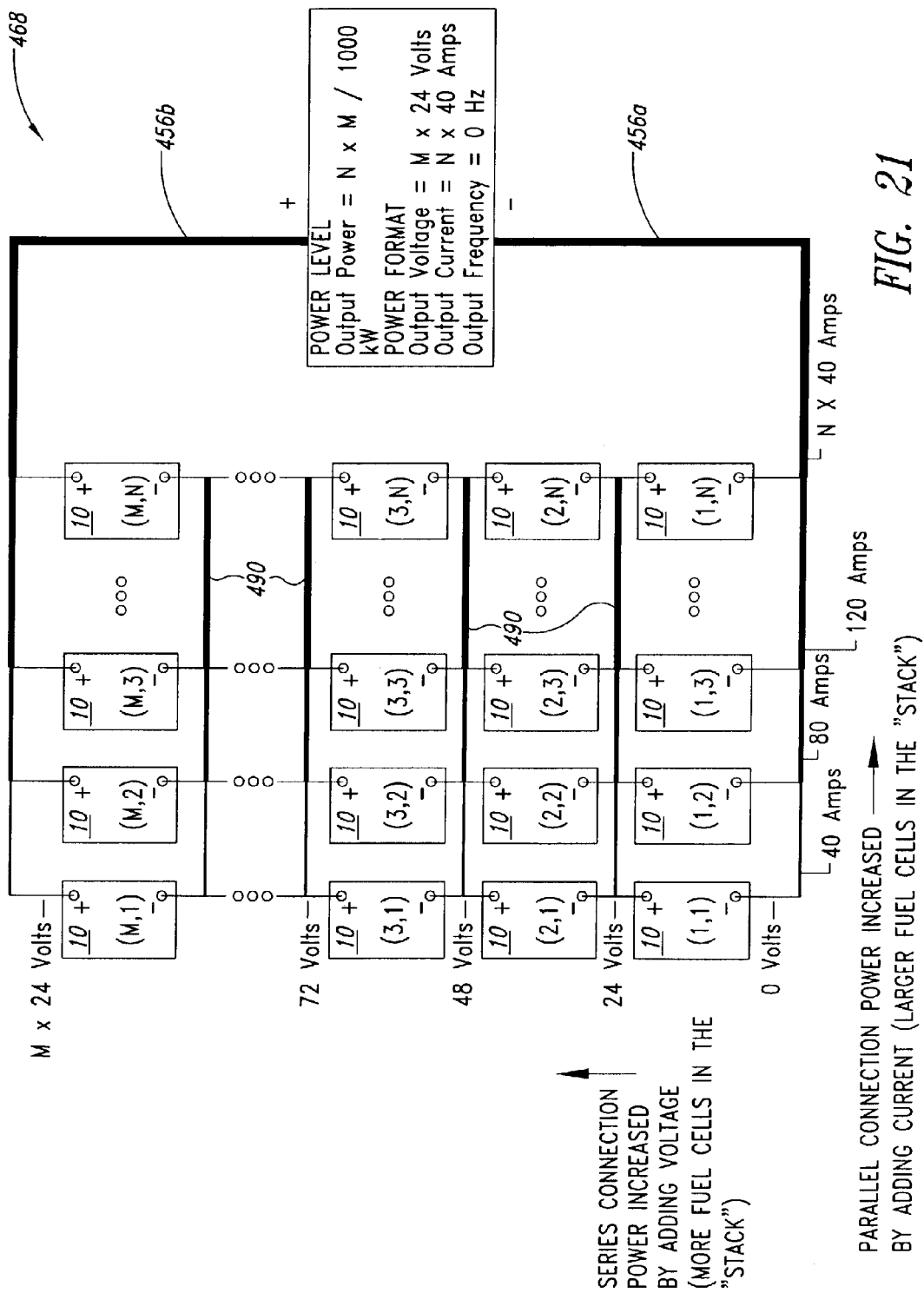
FIG. 21 is a schematic diagram of a power supply system including a number of fuel cell systems forming a two-dimensional array of fuel cell systems electrically coupled in series and parallel to provide at least N+1 redundancy.

FIG. 21 shows a two-dimensional array 468 of fuel cell systems 10, arranged in a number M of rows and a number N of columns to form a power system for powering one or more loads 12 via the power bus 456a, 456b. The fuel cell systems 10 are individually referenced 10(1,1)–10(M,N) where the first number in the parentheses refers to a row position and the second number in the parentheses refers to a column position of fuel system 10 in the two-dimensional array 468. The ellipses in FIG. 21 illustrate that various rows and columns of the two-dimensional array 468 may comprise additional fuel cell systems (not explicitly shown). While not illustrated, other multi-dimensional arrays of fuel cell systems 10 are also possible, for example, three-dimensional arrays of fuel cell systems 10.

The two-dimensional array 468 of FIG. 21 is similar to that of FIG. 3, however, comprises links 490 electrically coupling the fuel cell systems 10 forming a row (e.g., 10(3,1), 10(3,2), 10(3,3), . . . 10(3,N)) for providing at least N+1 redundancy. The two-dimensional array 468 may omit the diodes 58, fault and redundancy switches 60, 62, and other elements of the previously discussed embodiments. The links 490 provide redundancy, preventing the failure of a single fuel cell system 10 from eliminating an entire voltage string (column). For example, without the links 490, if fuel cell system 10(2,1) was to fail, then fuel cell systems 10(1,1), 10(3,1) through 10(M,1) would be unavailable. The links 490 prevent the loss of any individual fuel cell system 10 in a column from hindering the ability to fully supply the load 12. As discussed below, the links 490 may be tapped or may form taps, to produce desired potentials on the rails of voltage buses.

Figure 22:
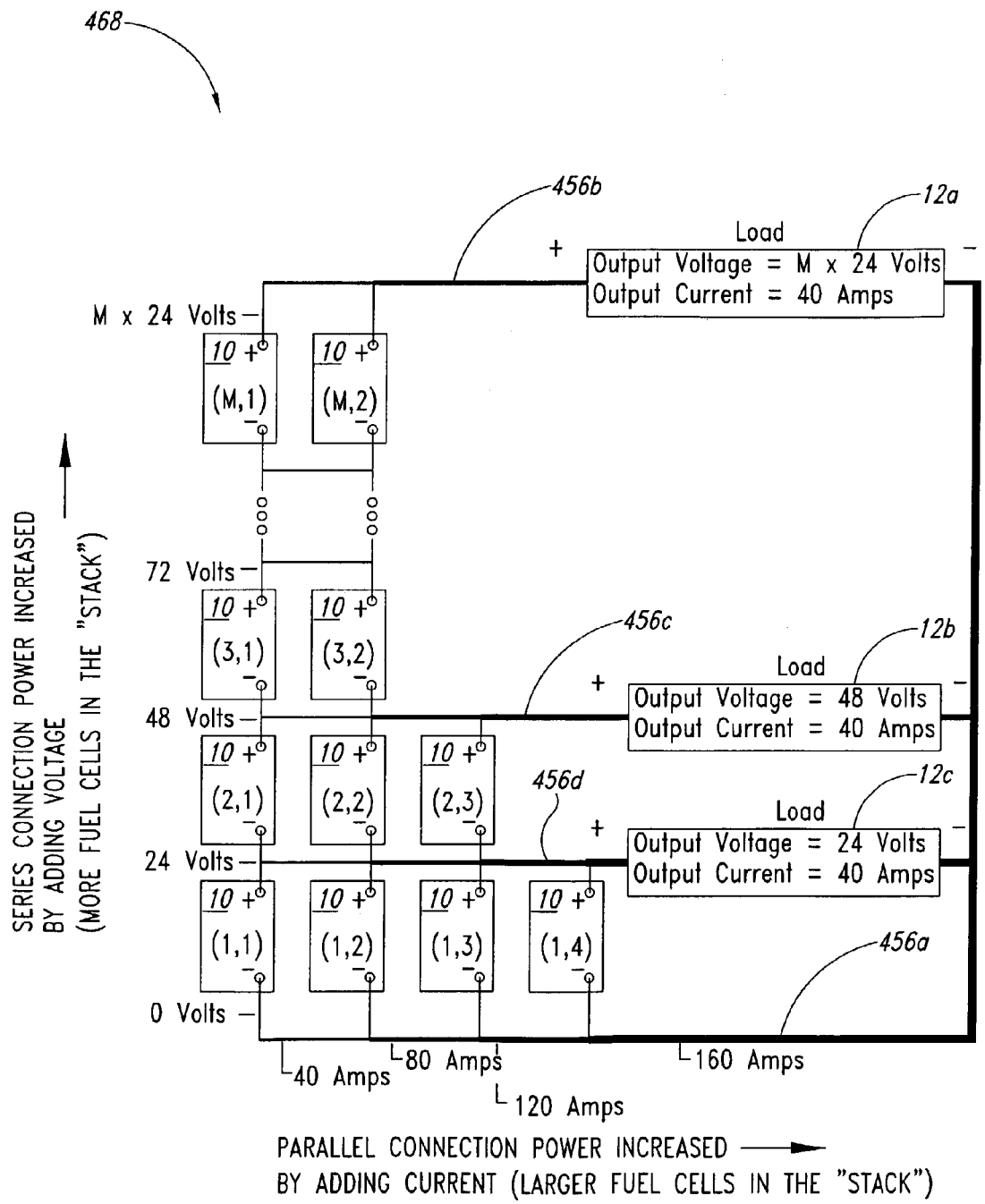
FIG. 22 is a schematic diagram of a power supply system including a number of fuel cell systems forming a two-dimensional array of fuel cell systems electrically coupled in series and parallel to provide multiple voltage levels with at least N+1 redundancy.

FIG. 22 shows an embodiment of the two-dimensional array 468 capable of providing multiple voltage levels with at least N+1 redundancy. A second column of fuel cell systems 10(1,2), 10(2,2), 10(3,2) . . . 10(M,2) can supply 40 amps at M×24 volts to a first load 12a via a voltage bus form by taps or rails 456a, 456b. A third column of fuel cell systems 10(1,3), 10(2,3) can supply 40 amps at 48 volts to a second load 12b via a second voltage bus formed by taps or rails 456b, 456c. A third column of fuel cell systems 10(1,4) can supply 40 amps at 24 volts to a third load 12c via a voltage bus formed by taps or rails 456b, 456d. If the load requires more current, additional columns of fuel cell systems 10 can be added between the rails of the corresponding voltage bus. Thus in the exemplary system, current can be increased in multiples of 40 amps by adding fuel cell systems 10 to the array 468.

A first column of fuel cell systems 10(1,1), 10(2,1), 10(3,1) . . . 10(M,1) provides redundancy for each of the other fuel cell systems 10 in the two-dimensional array 468. The number of fuel cell systems 10 in the first column is equal to the number of fuel cell systems 10 in the largest column of the array 469 to ensure at least N+1 redundancy. By employing a single column of fuel cell systems 10(1,1) –10(M,1), redundancy is provided to each of the other columns, without the need to provide specific fuel cell systems for each column. This obtains at least the desired N+1 redundancy with fewer fuel cell system 10 then in previously described embodiments.

Figure 23:
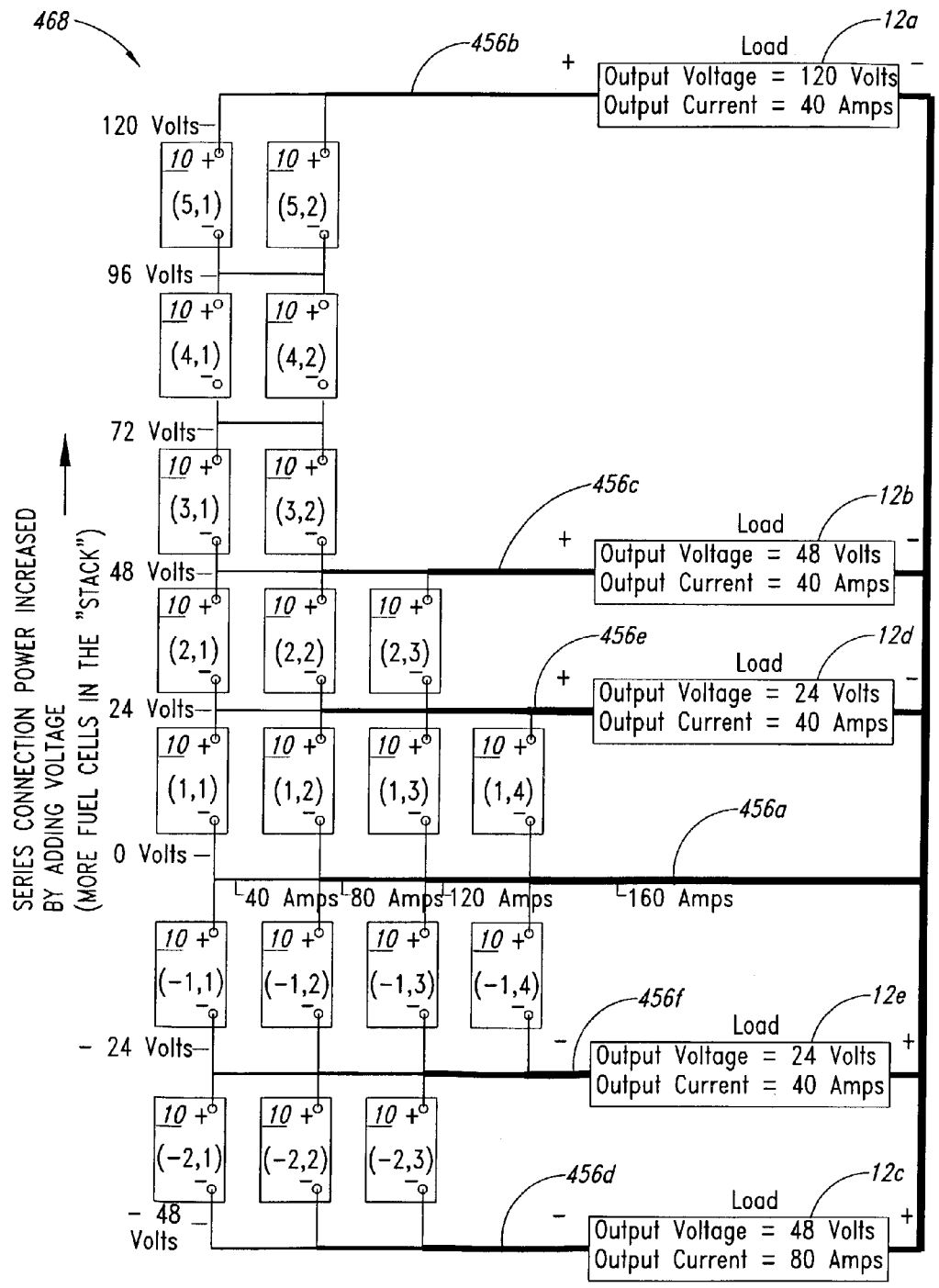
FIG. 23 is a schematic diagram of a power supply system including a number of fuel cell systems forming a two-dimensional array of fuel cell systems electrically coupled in series and parallel to provide multiple bipolar voltage levels With at least N+1 redundancy.

FIG. 23 illustrates another embodiment of a two-dimensional array 468 of fuel cell systems 10 suitable for supplying multiple bipolar voltage levels with redundancy. The second column of fuel systems 10(–2,2), 10(–1,2), 10(1,2), 10(2,2), 10(3,2), 10(4,2), 10(5,2) is capable of supplying 40 amps at 120 volts to the first load 12a via a voltage bus formed by taps or rails 456a, 456b. A third column of fuel cell systems 10(–2,3), 10(–1,3), 10(1,3), 10(2,3) is capable of supplying 40 amps at +48 volts to the second load 12b via a voltage bus formed by taps or rails 456a, 456c, or supplying 40 amps at –48 volts to a third load 12C via a voltage bus formed by taps or rails 456a, 456d. A fourth column of fuel cell systems 10(–1,4), 10(1,4) is capable of supply 40 amps at +24 volts to a fourth load 12d via voltage bus formed by taps or rails 456a, 456e, or supplying 40 amps at –24 volts to a fifth load 12e via voltage bus formed by taps or rails 456a, 456f. Again, a first column of fuel cell systems 10(–2,1), 10(–1,1), 10(1,1), 10(2,1), 10(3,1), 10(4,1), 10(5,1) provides at least N+1 redundancy to all the remaining fuel cell systems 10 in the array 468.

While not illustrated, the array 468 may employ one or more equalizing circuits to aid in system startup by balancing the load to provide a reference. The equalizing circuits may be as described in relation to FIG. 20, above. Where the fuel cell systems 10 employ ultracapacitors, for example, equalizing devices for the intermediate voltages across any number of series connected fuel cell systems 10 may be added to improve the source impedance (stiffness) of the intermediate buses.

The embodiment of FIG. 23 is particularly suitable for providing power conditioning and/or power backup in telephone related applications, such as telephone switching offices which typically employ 24 volts for wireless communications such as Personal Communications Services (PCS) and microwave repeater stations, 48 volts for traditional communications via wire (Wireline), and 120 volts DC for switching operations and substations.

EXAMPLE

Figure 24:
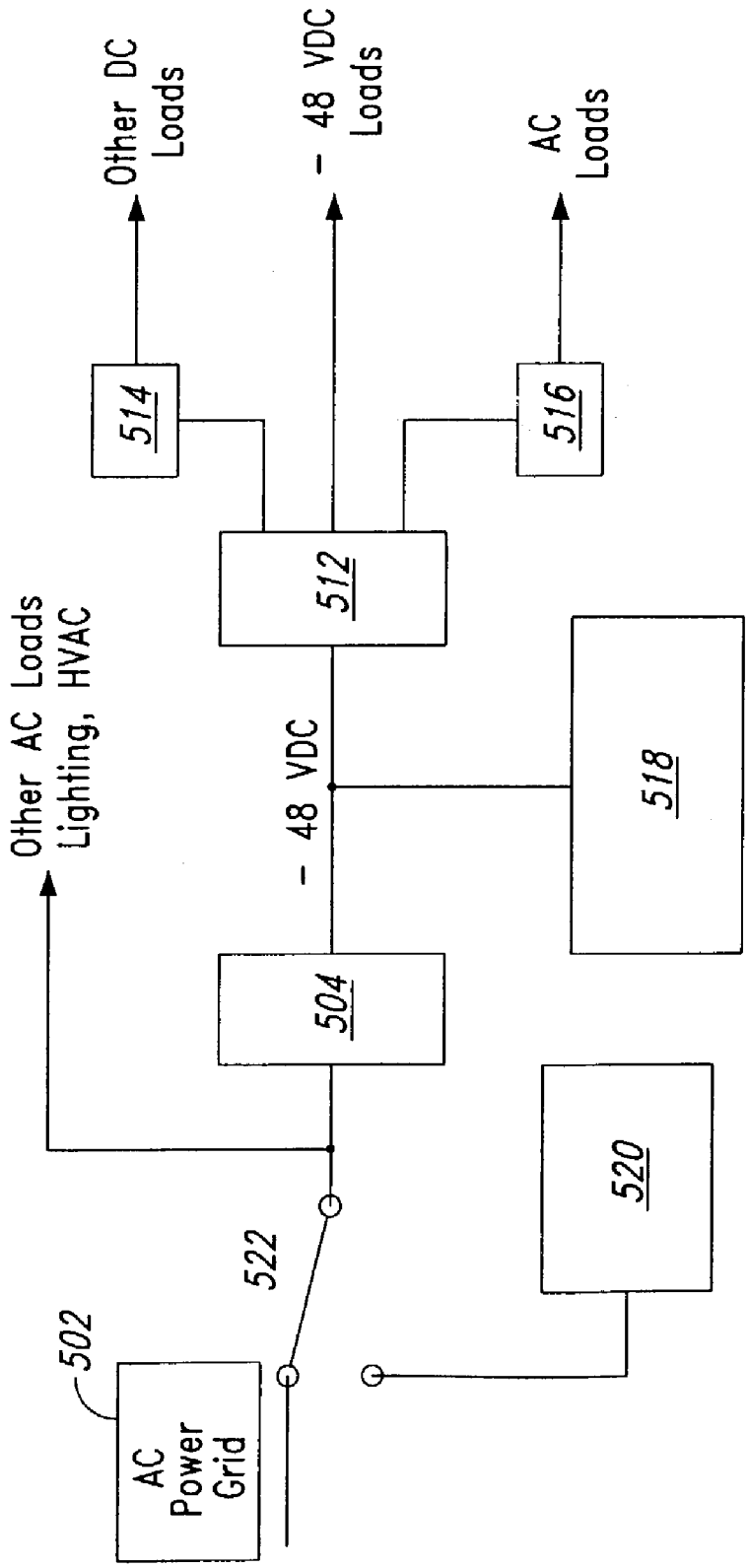
FIG. 24 is a schematic illustration of a conventional DC back-up power or UPS system.
Figure 25:
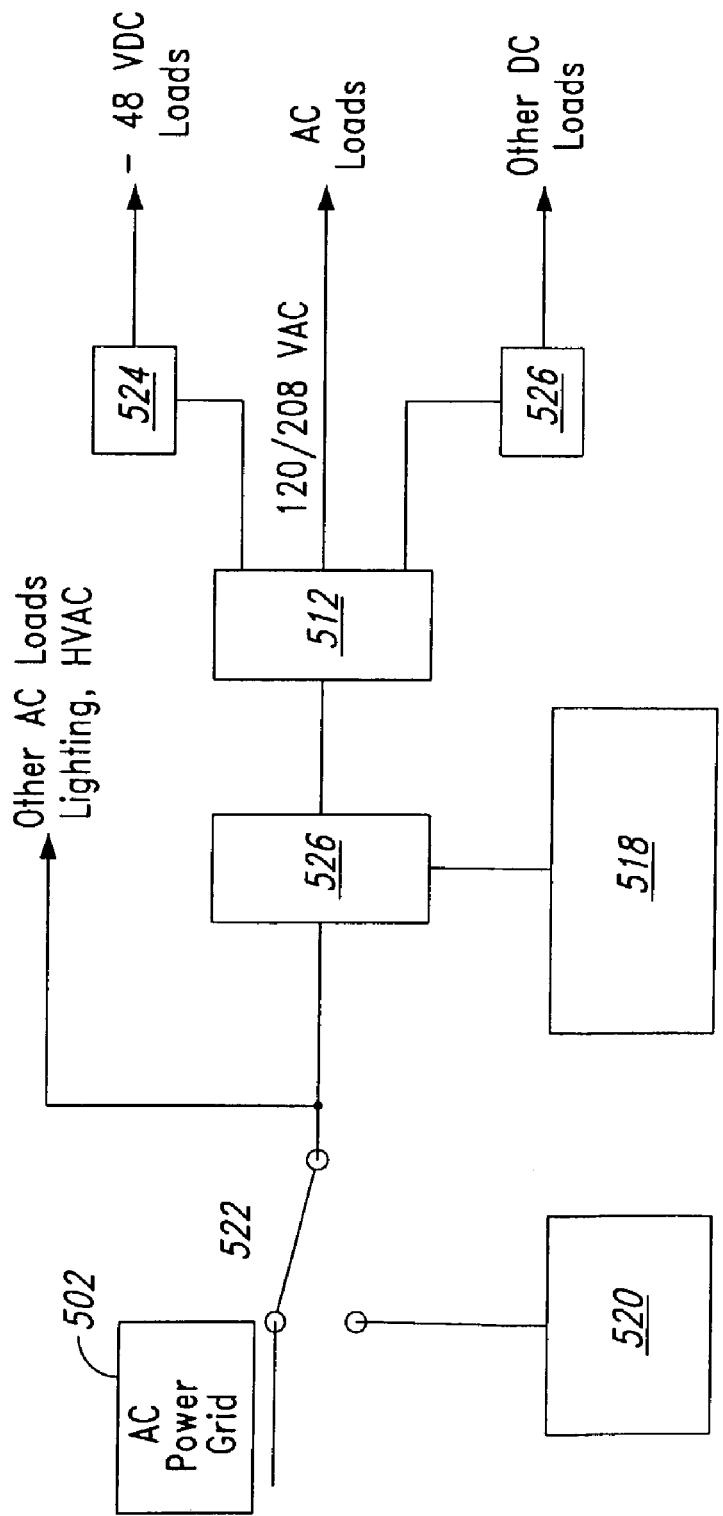
FIG. 25 is a schematic illustration of a conventional AC back-up power or UPS system.

FIGS. 24 and 25 are schematic illustrations of conventional back-up or UPS systems. In FIG. 24, power grid 502 normally supplies power to rectifier 504 and other AC loads such as lighting, HVAC, and other equipment. Rectifier 504 converts the AC power from the grid to DC power and directs it to DC power distribution panel 512. From panel 512 power may be directly supplied to compatible voltage DC loads. Power may also be directed to DC/DC converter 514, which converts it to a different voltage for use by other DC loads; or to inverter 516, which converts the power to an AC source for use by AC loads. If the grid fails, power is supplied by battery bank 518 to panel 512. Battery bank 518 will be sized to provide adequate power to critical loads for the desired amount of time. Standby generator 520 is brought online by switch 152 to provide power if the grid is interrupted for an extended period.

In FIG. 25, power from the grid is normally supplied from AC power distribution panel 512 to AC loads directly, to −48 VDC loads via rectifier 156, and/or to other DC loads via AC/DC converter 158. If the grid fails, power is supplied by battery bank 518 to inverter 154, which converts the DC source to an AC source. As in FIG. 24, standby generator 520 is brought online to provide power if the grid is interrupted for an extended period.

FIGS. 26–29 are schematic illustrations of conventional VRLA power supply systems and embodiments of the present power plant.

Figure 26:
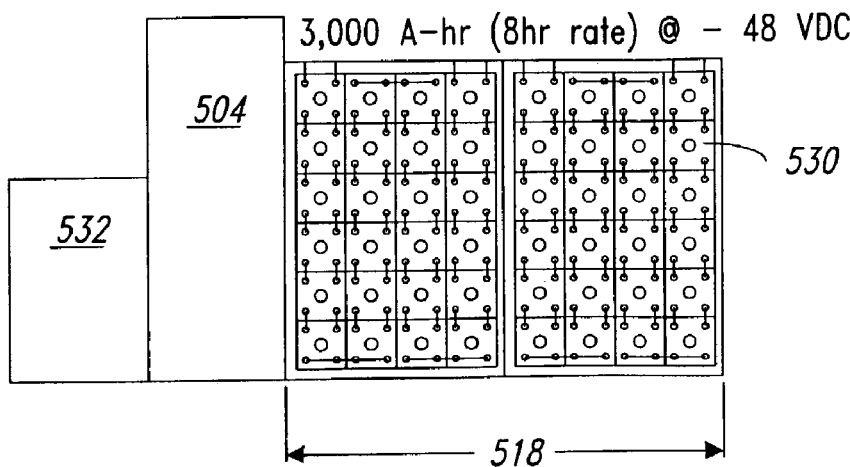
FIGS. 26 and 27 are schematic illustrations of a conventional 400 A 4 hour power supply employing VRLA battery banks and a comparable embodiment of the present power plant, respectively.
Figure 27:
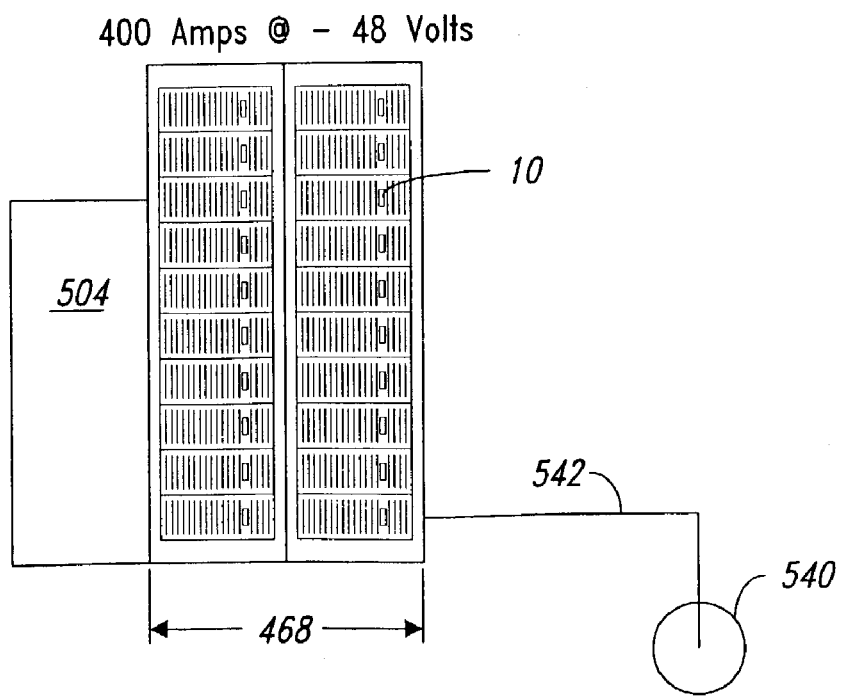

The systems illustrated in FIGS. 26 and 27 are capable of providing power at 400 A/48 VDC for 4 hours (400 A 4 hr back-up). In FIG. 26, the power grid normally supplies load power via rectifier 504. When the power grid is interrupted, VRLA batteries 530 in battery bank 518 provide load power. Once the grid is restored, it supplies power to rectifier 532 in order to recharge battery bank 518.

The embodiment of FIG. 27 comprises an array 468 of fuel cell systems 10 configured to provide 400 A/48 VDC power. Array 468 has ten sets of two fuel cell systems: the two fuel cell systems in each set electrically coupled in series, with each set electrically coupled in parallel. Each fuel cell system 10 comprises a 47-cell PEM fuel cell stack producing 1 kW at 24 volts and 40 amps, electrically coupled in parallel to two 12 VDC VRLA batteries. When grid power is interrupted, hydrogen from hydrogen supply 540 is supplied to the fuel cells of array 468 via supply line 542; air is also supplied to the fuel cells from an appropriate air supply (not shown). Electric power generated by array 468 is then supplied to the load. Once grid power is restored, it supplies power to rectifier 504 in order to recharge the batteries of fuel cell systems 10, if required. In FIG. 27, hydrogen supply 540 is a 100 gal. (380 l) 3600 psi (25 MPa) hydrogen tank, which holds sufficient hydrogen for array 468 to continuously supply load power for 4 hours.

The dimensions, weight and footprint of the 400 A 4 hour systems of FIGS. 26 and 27 are summarized in Table 1. The size and weight of battery bank 518 is based on currently-available VRLA battery banks. The battery bank rating used in the comparison is based on a 10×recharge rate and assumes a constant current load. The rectifier rating is based on the load current plus a 0.1 C battery charging current. Front clearance refers to area between adjacent walls and the back and sides of the power supply required by safety regulations.

TABLE 1

Comparison of 400 A/48 VDC 4 hour back-up power systems

| VRLA Battery Bank | | Fuel Cell Array | |
| --- | --- | --- | --- |
| Battery Rating | 3000 A-hr | Array Rating | 400 A @ 48 VDC |
| Battery Size | Width: 93 in (236 cm) | Array Size | Width: 48 in (122 cm) |
| | Depth: 21 in (53 cm) | | Depth: 36 in (91 cm) |
| | Height: 72 in (183 cm) | | Height: 84 in (213 cm) |
| Battery Weight | 13,725 lbs. (6020 kg) | Array Weight | 2000 lbs. (910 kg) |
| Footprint | 13.6 ft$^2$ (1.3 m$^2$) | Footprint | 12.0 ft$^2$ (1.1 m$^2$) |
| Floor Loading | 979 lbs./ft$^2$ (149 kgf/m$^2$) | | 167 lbs./ft$^2$ (25.3 kgf/m$^2$) |
| Rectifier Rating | 700 A @ 54 VDC | Rectifier Rating | 410 A @ 54 VDC |
| Rectifier Size | Width: 48 in (122 cm) | Rectifier Size | Width: 24 in (61 cm) |
| | Depth: 21 in (53 cm) | | Depth: 3 6 in (91 cm) |
| | Height: 72 in (183 cm) | | Height: 72 in (183 cm) |
| Rectifier Footprint | 7.0 ft$^2$ (0.65 m$^2$) | Rectifier Footprint | 6.0 ft$^2$ (0.56 m$^2$) |
| Front Clearance | Width: 141 in (358 cm) | Front Clearance | Width: 72 in (183 cm) |
| | Depth: 36 in (91 cm) | | Depth: 36 in (91 cm) |
| Clearance Footprint | 35.3 ft$^2$ (3.3 m$^2$) | Clearance Footprint | 18.0 ft$^2$ (1.7m$^2$) |
| Total Footprint | 55.9 ft$^2$ (5.2 m$^2$) | Total Footprint | 36 ft$^2$ (3.3 m$^2$) |

Figure 28:
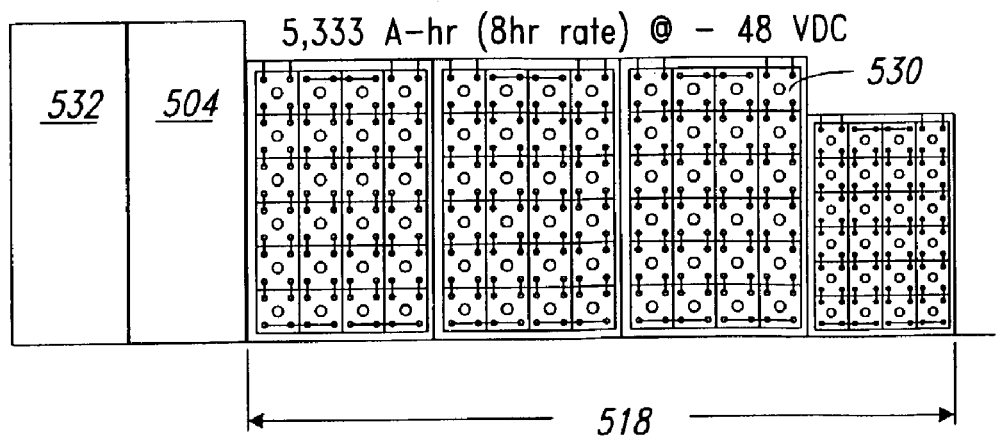
FIGS. 28 and 29 are schematic illustrations of a conventional 400 A 8 hour power supply employing VRLA battery banks and a comparable embodiment of the present power plant, respectively.
Figure 29:
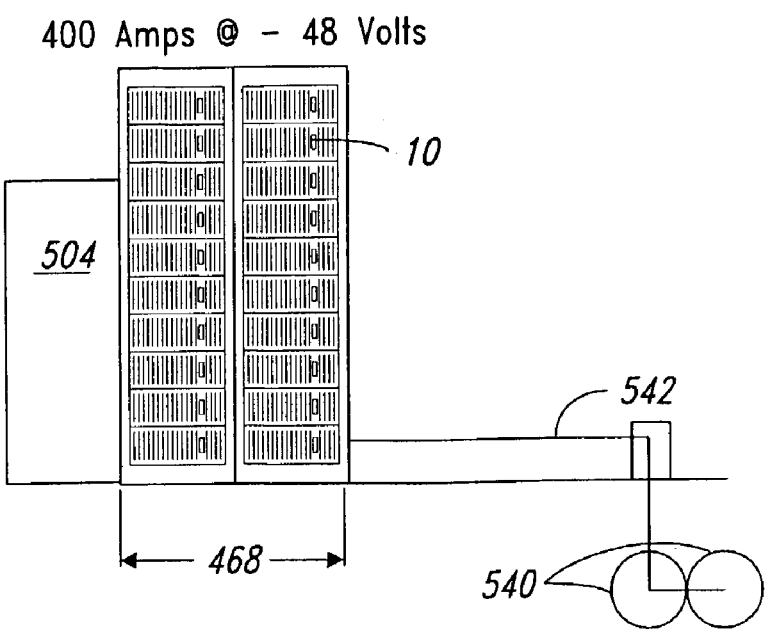

The system illustrated in FIGS. 28 and 29 are configured to provide 400 A/48 VDC power for 8 hours (400 A 8 hr back-up). Array 468 is as described in FIG. 27. Because of the longer run time, hydrogen storage 540 in FIG.29 comprises 2×100 gal. (380 l) 3600 psi (25 MPa) hydrogen tanks.

The dimensions, weight and footprint of the 400 A 8 hour systems of FIGS. 28 and 29 are summarized in Table 2. The comparative data is based on the same assumptions given for the data in Table 1.

TABLE 2

Comparison of 400 A/48 VDC 8 hour back-up power systems

| VRLA Battery Bank | | Fuel Cell Array | |
| --- | --- | --- | --- |
| Battery Rating | 5333 A-hr | Array Rating | 400 A @ 48 VDC |
| | | Battery Rating | 104 A-hr |

TABLE 2-continued

Comparison of 400 A/48 VDC 8 hour back-up power systems

| | VRLA Battery Bank | | Fuel Cell Array |
|---|---|---|---|
| Battery Size | Width: 165 in (420 cm) Depth: 21 in (53 cm) Height: 72 in (183 cm) | Array Size | Width: 48 in (122 cm) Depth: 36 in (91 cm) Height: 84 in (213 cm) |
| Battery Weight | 23,585 lbs. (10,700 kg) | Array Weight | 2000 lbs. (910 kg) |
| Footprint | 24.1 ft² (2.2 m²) | Footprint | 12.0 ft² (1.1 m²) |
| Floor Loading | 979 lbs./ft² (149 kgf/m²) | | 167 lbs./ ft² (25.3 kgf/m²) |
| Rectifier Rating | 933 A @ 54 VDC | Rectifier Rating | 410 A @ 54 VDC |
| Rectifier Size | Width: 72 in (183 cm) Depth: 21 in (53 cm) Height: 72 in (183 cm) | Rectifier Size | Width: 24 in (61 cm) Depth: 36 in (91 cm) Height: 72 in (183 cm) |
| Rectifier Footprint | 10.5 ft² (0.98 m²) | Rectifier Footprint | 6.0 ft² (0.56 m²) |
| Front Clearance | Width: 237 in (602 cm) Depth: 36 in (91 cm) | Front Clearance | Width: 72 in (183 cm) Depth: 36 in (91 cm) |
| Clearance Footprint | 59.3 ft² (5.5 m²) | Clearance Footprint | 18.0 ft² (1.7 m²) |
| Total Footprint | 93.9 ft² (8.7 m²) | Total Footprint | 36 ft² (3.3 m²) |

As previously mentioned, there are environmental concerns relating to current VRLA battery-based power supplies. Environmental regulations relating to the storage and operation of the batteries increases the cost of the power supply. Furthermore, the risk of liability for hazardous/toxic site clean-up in the event of an accidental discharge of battery components is significant.

As shown in Tables 1 and 2, even embodiments of the present power plant incorporating VRLA batteries significantly reduce the costs and potential environmental liability associated with current VRLA battery-based power supplies. For example, the power supply of FIG. 27 requires 95.4% less batteries than the conventional system of FIG. 26. Between the power supplies of FIGS. 28 and 29, there is a 97.4% reduction in the number of VRLA batteries employed. Of course, in other embodiments of the present power supply, VRLA batteries may be eliminated entirely.

Tables 1 and 2 also show the reduction in weight and footprint of the present power supply compared to conventional VRLA battery-based power supplies. The embodiments of FIGS. 27 and 29 represent an area savings of 19.9 ft² (1.9 m²) and 57.9 ft² (5.4 m²), respectively, compared to the conventional systems. For many point-of-presence applications, where the costs of housing the power supply can reach or exceed $US 650.00/ft², the smaller footprint of the present power plant alone can provide significant cost savings. Additional cost savings may be realized due to the smaller size and footprint of the rectifier required for the embodiments of the present power plant compared to the conventional power supplies.

The data in Tables 1 and 2 does not take into account the dimensions and footprint of the hydrogen storage associated with the power plants of FIGS. 27 and 29. This is because the hydrogen storage does not have to be situated with the rest of the power plant. In conventional power supplies, the batteries are both the energy storage device and the electrical power source. As a practical matter, the battery banks must be situated close to the power distribution panel and/or load, since power losses in DC systems increase dramatically with the distance from the power source. In the present power plant, the energy storage device is decoupled from the electrical power source; hence, the hydrogen storage equipment may be placed any desired distance from the fuel cell array. Thus, it is not necessary to store the hydrogen storage equipment indoors with the rest of the present power plant and, therefore, to include it in the footprint analysis.

The decoupling of energy storage and power supply in the present power plant may provide significant advantages over current battery systems. Hydrogen storage equipment could be placed outside, in an out-building or in an underground facility, for example. In certain telecom applications, for example, communications equipment is often situated on the roof of a building. Most building codes will not permit a VRLA battery bank to be installed on the roof, so the back-up power supply must be installed some distance from the equipment. As mentioned earlier, this arrangement can result in significant power losses in providing power from the batteries to the load(s). With the present power plant, on the other hand, the fuel cell array may be installed on the roof, because of its lower floor loading, and hydrogen could be supplied from hydrogen storage equipment located any distance from the equipment, without an attendant power loss.

Furthermore, a low-cost underground facility could be used for the hydrogen storage equipment. Indeed, it may be possible to simply bury hydrogen tanks, for example, near the facility housing the fuel cell array: this is because hydrogen does not contaminate groundwater, but will percolate out of the soil in case of a leak. The fact that hydrogen does not pollute groundwater means that expensive containment vessels, such as required for diesel or other fuel tanks, are not required. Thus, hydrogen storage may be less costly and more environmentally friendly than other options.

In fact, conventional power supplies, such as shown in FIG. 26 or 28, could be upgraded to an embodiment of the present power supply by replacing the battery bank with a suitably sized fuel cell array and hydrogen storage. Existing rectifiers employed for recharging the batteries could be eliminated or used to increase the output of the power supply. Take, for example, the conventional 400 A 4 hour back-up power supply of FIG. 26. Because the fuel cell array 468 of the present power plant does not require rectifier 532 for recharging, two rectifiers 504 may be employed to supply load power, if desired. Thus, the power supply of FIG. 26 could be upgraded to a 800 A power supply. Furthermore, by suitably selecting the capacity of the hydrogen storage, the upgraded system could supply back-up power for 4–8 hours, or more. At the same time, the upgraded system would have a smaller footprint.

While the illustrated embodiments are described as −48 VDC systems, the present power plant is not limited to such systems. For example, the present power plant may be configured like array 468 of FIG. 23 in order to supply DC power at 24, 48 and 120 V, or otherwise configured to supply DC power of any desired voltage(s). Similarly, the present power plant may be configured to provide AC power. For example, by substituting rectifier 504 in FIG. 27 or 29 with an inverter, the illustrated embodiments would be suitable for use as an AC power supply system.

CONCLUSION

The disclosed embodiments provide a "building block" or "component" approach to the manufacture of power supply systems, allowing a manufacturer to produce a large variety of power supply systems from a few, or even only one, basic type of fuel cell system 10. This approach may lower design, manufacturer and inventory costs, as well as providing redundancy to extend the mean time between failures for the resulting end user product (i.e., the power system). This approach may also simplify and reduce the cost of maintenance or repair.

Although specific embodiments of, and examples for, the power supply system and method are described herein for illustrative purposes, various equivalent modifications can be made without departing from the spirit and scope of the invention, as will be recognized by those skilled in the relevant art. For example, the teachings provided herein can be applied to fuel cell systems 10 including other types of fuel cell stacks 14 or fuel cell assemblies, not necessarily the polymer exchange membrane fuel cell assembly generally described above. Additionally or alternatively, the fuel cell system 10 can interconnect portions of the fuel cell stack 14 with portions of the electrical power storage device, such as cells of the battery, flywheel, or ultracapacitor bank 24. The fuel cell system 10 can employ various other approaches and elements for adjusting reactant partial pressures, or may operate without regard to partial pressure. The various embodiments described above can be combined to provide further embodiments.

Generally, the present power plant may be employed in a back-up power or UPS system for a range of applications, including, but not limited to:
1. Network server farms: LAN/WAN equipment such as hubs and routers.
2. Communications: CATV, radio, telecommunications storage systems and/or servers, wireless base stations, microwave repeater stations, radar tracking systems.
3. Computer rooms: small and mid-range servers, large enterprise servers, data storage systems, network computer clusters, internet data centers.
4. Desktop/Workstations: stand-alone PCs, workstations and computer peripherals.
5. Industrial/Commercial: process control equipment, medical equipment, laboratory instrumentation, traffic management systems, security equipment, point of sale equipment.

In addition, the present power supply may also be used in peak power or distributed power applications.

The present power plant and operating method provide for a system that is smaller and lighter than conventional power supply systems employing VRLA batteries. The present power plant also provides for "instant on" operation with individual fuel cell systems that are "hot swappable".

All of the U.S. patents, U.S. patent application publications, U.S. patent applications, foreign patents, foreign patent applications and non-patent publications referred to in this specification and/or listed in the Application Data Sheet, including but not limited to U.S. Pat. No. 6,887,606, issued May 3, 2005, and entitled "FUEL CELL SYSTEM METHOD, APPARATUS AND SCHEDULING"; U.S. Pat. No. 6,841,275, Jan. 11, 2005 and entitled "METHOD AND APPARATUS FOR CONTROLLING VOLTAGE FROM A FUEL CELL SYSTEM"; U.S. patent application Ser. No. 10/017,462, filed Dec. 14, 2001, and entitled "METHOD AND APPARATUS FOR MULTIPLE MODE CONTROL OF VOLTAGE FROM A FUEL CELL SYSTEM"; U.S. Pat. No. 6,573,682, issued Jun. 3, 2003 and entitled "FUEL CELL SYSTEM MULTIPLE STAGE VOLTAGE CONTROL METHOD AND APPARATUS"; U.S. patent application Ser. No. 10/388,191, filed Mar. 12, 2003 and entitled "BLACK START METHOD AND APPARATUS FOR A FUEL CELL POWER PLANT, AND FUEL CELL POWER PLANT WITH BLACK START CAPABILITY"; U.S. patent application Ser. No. 10/440,034, filed May 16, 2003, and entitled "ADJUSTABLE ARRAY OF FUEL CELL SYSTEMS"; U.S. patent application Ser. No. 10/440,451, filed May 16, 2003, and entitled "METHOD AND APPARATUS FOR FUEL CELL SYSTEMS"; and U.S. Pat. No. 6,838,923, issued Jan. 4, 2005, and entitled "POWER SUPPLIES AND ULTRACAPACITOR BASED BATTERY SIMULATOR", are incorporated herein by reference in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification claimed, but should be construed to include all fuel cell systems that operate in accordance with the claims. Accordingly, the invention is not limited by the disclosure but instead its scope is to be determined entirely by the following claims.

I claim:
1. An electric power plant comprising:
   a power supply system, the power supply system comprising:
      a power bus,
      a first and second fuel cell system, each fuel cell system comprising a fuel cell stack, an electrical power storage device electrically coupled in parallel with the fuel cell stack, and means for controlling a flow of current from the fuel cell stack to the electrical power storage device and the power bus,
      a first switch selectively operable to electrically couple the first fuel cell system in series in the power bus, and
      a second switch selectively operable to electrically couple the second fuel cell system in series in the power bus;
      an oxidant supply system for supplying an oxidant gas to at least one of the fuel cell stacks; and
      a fuel supply system for supplying a fuel gas to at least one of the fuel cell stacks,
   wherein the first switch is selectively operable according to an operating condition of the first fuel cell system, and wherein the power supply system further comprises a first redundancy switch electrically coupled in series with the first switch and selectively operable therewith to electrically couple the first fuel cell system in series to the power bus, the first redundancy switch being selectively operable according to at least one of the operating condition of at least the second fuel cell system, a voltage across the power bus, a desired output of the power supply system and a desired nominal current output of the power supply system.

2. The power plant of claim 1 wherein the first fuel cell system comprises a first fuel cell stack, a first electrical storage device electrically coupled in parallel with the first fuel cell stack, a first series pass element electrically coupled in between the first fuel cell stack and the first electrical storage device, and a first regulating circuit controllingly coupled to the first series pass element, and wherein the second fuel cell system comprises a second fuel cell stack, a second electrical storage device electrically coupled in parallel with the second fuel cell stack, a second series pass element electrically coupled between the second fuel cell stack and the second electrical storage device, and a second regulating circuit controlling coupled to the second series pass element.

3. The power plant of claim 1 wherein the first fuel cell system comprises a first fuel cell stack, and a first reactant supply system having a first control element operable to control a partial pressure of at least a first reactant to the first fuel cell stack, and wherein the second fuel cell system comprises a second fuel cell stack, and a second reactant supply system having a second control element operable to control a partial pressure of at least a first reactant to the second fuel cell stack.

4. The power plant of claim 1 wherein the first switch is one of a contactor and a transistor.

5. The power plant of claim 1 wherein the power supply further comprises a third fuel cell system, and a third switch selectively operable to electrically couple the third fuel cell system in series in the power bus.

6. The power plant of claim 1 wherein the power supply system further comprises a third fuel cell system, and a third switch selectively operable to electrically couple the third fuel cell system in the power bus in parallel with at least one of the first and the second fuel cell systems.

7. The power plant of claim 1 wherein the power supply system further comprises a first diode electrically coupled in series in the power bus between the first and the second fuel cell systems.

8. The electric power plant of claim 1 wherein the first switch is closed to electrically couple the first fuel cell system in series with the power bus, and wherein the first switch is opened upon the operating condition corresponding to a fault or a failure in its respective fuel cell stack.

9. The electric power plant of claim 8 wherein the first switch is a fault switch.

10. The electric power plant of claim 8, further comprising:
a controller operable to close and open its respective fuel cell stack based upon the operating condition corresponding to the fault or the failure.

11. A method for operating an electric power plant having at least a first fuel cell system comprising a first fuel cell stack, an electrical power storage device electrically coupled in parallel with the first fuel cell stack, and a first switch to couple the first fuel cell system to a power bus; a second fuel cell system comprising a second fuel cell stack, another electrical power storage device electrically coupled in parallel with the second fuel cell stack, and a second switch to couple the second fuel cell system to the power bus; wherein the first fuel cell system further comprises a redundancy switch in series with the first switch and the power bus, the method comprising:

closing the first switch and the redundancy switch of the first fuel cell system to electrically couple the first fuel cell system to the power bus,
wherein the redundancy switch is selectively operable according to at least one of an operating condition of at least the second fuel cell system, a voltage across the power bus, a desired output of a power supply system and a desired nominal current output of the power supply system.

12. The method of claim 11, further comprising:
opening the redundancy switch upon detection of the operating condition.

13. The method of claim 11, further comprising:
opening the first switch to disconnect the first fuel cell system from the power bus upon occurrence of a second operating condition in a fuel cell stack of the first fuel cell system.

14. The method of claim 11, further comprising:
detecting the operating condition.

15. The method of claim 11 wherein the operating condition further comprises at least one selected from a group consisting of a voltage across the power bus, an operating parameter specified by a user, a current on the power bus, a voltage on the power bus, a load condition, a stack current, a stack voltage, a battery current, a battery voltage, a temperature, an ambient hydrogen level, an ambient oxygen level and a reactant flow.

16. The method of claim 11, further comprising:
generating a signal in response to detecting the operating condition.

17. The method of claim 16, further comprising:
communicating the signal generated from a controller that detects the operating condition to the redundancy switch such that the redundancy switch is opened.

18. The method of claim 11, further comprising:
detecting the operating condition in the second fuel cell stack.

19. The method of claim 18 wherein the operating condition in the second fuel cell stack is a fault.

20. The method of claim 18 wherein the operating condition in the second fuel cell stack is a failure.

21. A system for operating an electric power plant having at least a first fuel cell system comprising a first fuel cell stack, an electrical power storage device electrically coupled in parallel with the first fuel cell stack, and a first switch to couple the first fuel cell system to a power bus; a second fuel cell system comprising a second fuel cell stack, another electrical power storage device electrically coupled in parallel with the second fuel cell stack, and a second switch to couple the second fuel cell system to the power bus; wherein the first fuel cell system further comprises a redundancy switch in series with the first switch and the power bus, comprising:
means for closing the first switch and the redundancy switch of the first fuel cell system to electrically couple the first fuel cell system to the power bus,
wherein the redundancy switch is selectively operable according to at least one of an operating condition of at least the second fuel cell system, a voltage across the power bus, a desired output of a power supply system and a desired nominal current output of the power supply system.

22. The system of claim 21, further comprising:
means for detecting one of a fault or a failure in the second fuel cell stack such that the first switch is opened.

23. The system of claim 21, further comprising:
means for detecting the operating condition, wherein the other operating condition comprises at least one selected from a group consisting of a voltage across the power bus, an operating parameter specified by a user, a current on the power bus, the voltage on the power bus, a load condition, a stack current, a stack voltage, a battery current, a battery voltage, a temperature, an ambient hydrogen level, an ambient oxygen level and a reactant flow.

* * * * *